US012538187B2

(12) United States Patent
Pham Van et al.

(10) Patent No.: US 12,538,187 B2
(45) Date of Patent: Jan. 27, 2026

(54) CONTINUITY OF MULTICAST AND BROADCAST SERVICES FOR USER EQUIPMENTS IN MOBILITY

(71) Applicant: Telefonaktiebolaget LM Ericsson (publ), Stockholm (SE)

(72) Inventors: Dung Pham Van, Upplands Väsby (SE); Erik Stare, Sollentuna (SE); Paul Schliwa-Bertling, Ljungsbro (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 433 days.

(21) Appl. No.: 18/013,573

(22) PCT Filed: Jun. 30, 2021

(86) PCT No.: PCT/EP2021/068075
§ 371 (c)(1),
(2) Date: Dec. 29, 2022

(87) PCT Pub. No.: WO2022/003058
PCT Pub. Date: Jan. 6, 2022

(65) Prior Publication Data
US 2023/0300682 A1    Sep. 21, 2023

Related U.S. Application Data

(60) Provisional application No. 63/046,582, filed on Jun. 30, 2020.

(51) Int. Cl.
*H04W 36/00* (2009.01)
*H04W 4/06* (2009.01)
(52) U.S. Cl.
CPC ......... *H04W 36/0007* (2018.08); *H04W 4/06* (2013.01)

(58) Field of Classification Search
CPC .............................. H04W 36/0007; H04W 4/06
See application file for complete search history.

(56) References Cited

U.S. PATENT DOCUMENTS

2009/0238107 A1* 9/2009 Li .................... H04W 72/30
370/312
2013/0114405 A1* 5/2013 Kim ..................... H04W 48/02
370/312

(Continued)

FOREIGN PATENT DOCUMENTS

JP          2018137784 A    6/2018
WO    WO 2019/161927 A1   8/2019

OTHER PUBLICATIONS

International Search Report and Written Opinion of the International Searching Authority, PCT/EP2021/068075, mailed Oct. 29, 2021, 11 pages.

(Continued)

*Primary Examiner* — Kenny S Lin
(74) *Attorney, Agent, or Firm* — Sage Patent Group

(57) ABSTRACT

Embodiments of the present disclosure provide a method, a user equipment, UE, a network node, and a computer program product for transmission of multicast and broadcast services, MBS, to a user equipment, UE, in a wireless communication network. The method is performed by a target network node in the wireless communication network. The method includes determining that the UE is involved in a MBS session with a source network node. Upon determining that the UE is involved in the MBS session with the source network node, the method includes obtaining a MBS context of the UE related to the MBS session. Further, the method includes determining provisioning of a Point-To-Multipoint, PTM, configuration information associated with the MBS session to be acquired by the UE for enabling continuous reception of MBS data from the target network (Continued)

node. Corresponding network node, UE, and computer program products are also disclosed.

25 Claims, 18 Drawing Sheets

(56) References Cited

U.S. PATENT DOCUMENTS

| | | | |
|---|---|---|---|
| 2015/0223035 A1* | 8/2015 | Lee | H04L 1/1812 370/312 |
| 2018/0115430 A1* | 4/2018 | Seo | H04W 74/0833 |
| 2018/0139665 A1 | 5/2018 | Park et al. | |
| 2018/0206080 A1 | 7/2018 | Wei-Yu et al. | |
| 2018/0270713 A1 | 9/2018 | Kyungmin et al. | |
| 2019/0014492 A1* | 1/2019 | Kim | H04L 5/0053 |
| 2019/0158985 A1* | 5/2019 | Dao | H04W 28/04 |
| 2021/0051472 A1 | 2/2021 | Mei-Ju et al. | |
| 2022/0150973 A1* | 5/2022 | Lim | H04W 72/23 |
| 2023/0023919 A1* | 1/2023 | Qi | H04W 72/30 |
| 2023/0199569 A1* | 6/2023 | Cao | H04W 4/06 370/331 |
| 2024/0179580 A1* | 5/2024 | Fujishiro | H04W 36/0007 |

OTHER PUBLICATIONS

International Preliminary Report on Patentability, PCT/EP2021/068075, mailed Jun. 1, 2022, 8 pages.
3rd Generation Partnership Project; Technical Specification Group Radio Access Network; NR; NR and NG-RAN Overall Description; Stage 2 (Release 16) 3GPP TS 38.300 V16.1.0 (Mar. 2020) 133 pages.
3rd Generation Partnership Project; Technical Specification Group Services and System Aspects; Study on architectural enhancements for 5G multicast-broadcast services (Release 17) 3GPP TR 23.757 V0.4.0 (Jun. 2020) (XP051924091) 157 pages.
"New Work Item on NR support of Multicast and Broadcast Services," 3GPP TSG RAN Meeting #86, RP-193248, Sitges, Spain, Dec. 9-12, 2019, (revision of RP-193163) Huawei, Agenda Item 9.1.2 (XP051840378) 5 pages.
"KI#7, New Solution: Inter-RAN node MBS Session Handover," 3GPP TSG SA2 Meeting #139E S2-2004510 Elbonia, Jun. 1-12, 2020, Huawei, et al., Agenda Item 8.9 (XP051898913) 9 pages.
3rd Generation Partnership Project; Technical Specification Group Radio Access Network; NR; Radio Resource Control (RRC) protocol specification (Release 16) 3GPP TS 38.331 V16.0.0 (Mar. 2020) 835 pages.
3rd Generation Partnership Project; Technical Specification Group Radio Access Network; NG-RAN; NG Application Protocol (NGAP) (Release 16) 3GPP TS 38.413 V16.1.0 (Mar. 2020) 341 pages.
3rd Generation Partnership Project; Technical Specification Group Radio Access Network; NG-RAN; Xn application protocol (XnAP) (Release 16) 3GPP TS 38.423 V16.1.0 (Mar. 2020) 334 pages.
3rd Generation Partnership Project; Technical Specification Group Services and System Aspects; System architecture for the 5G System (5GS); Stage 2 (Release 16) 3GPP TS 23.501 V16.4.0 (Mar. 2020) 430 pages.
3rd Generation Partnership Project; Technical Specification Group Services and System Aspects; Procedures for the 5G System (5GS); Stage 2 (Release 16) 3GPP TS 23.502 V16.4.0 (Mar. 2020) 571 pages.
Office Action, Japanese Patent Application No. 2022-580365, mailed Jan. 30, 2024, 9 pages.
KI #1, New Sol: Xn Handover of MB Sessions, 3GPP TSG SA WG2 Meeting #139E, S2-2004494, Electronic Meeting, Jun. 1-12, 2020, Ericsson, Agenda Item 8.9, 7 pages.

\* cited by examiner

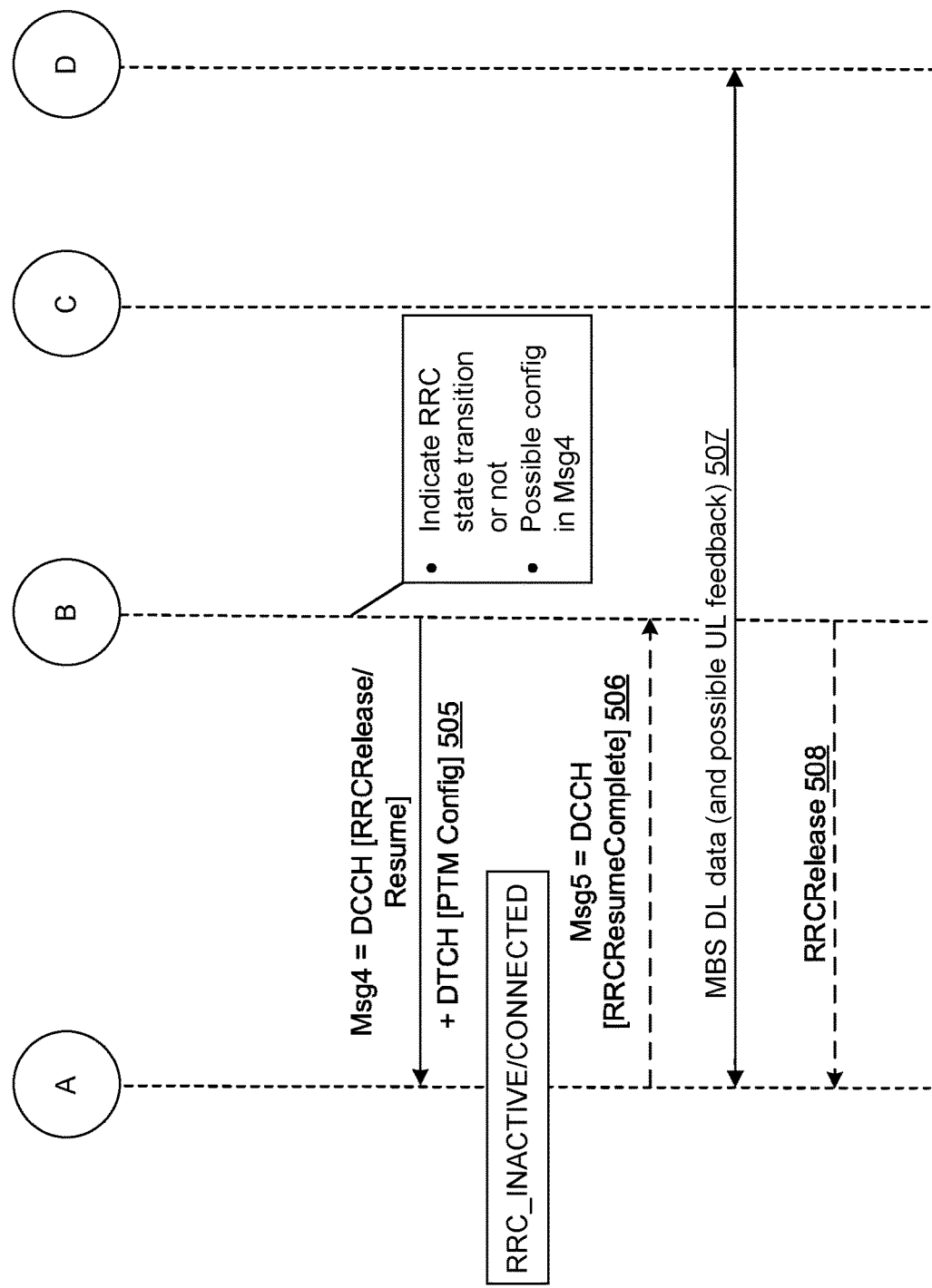

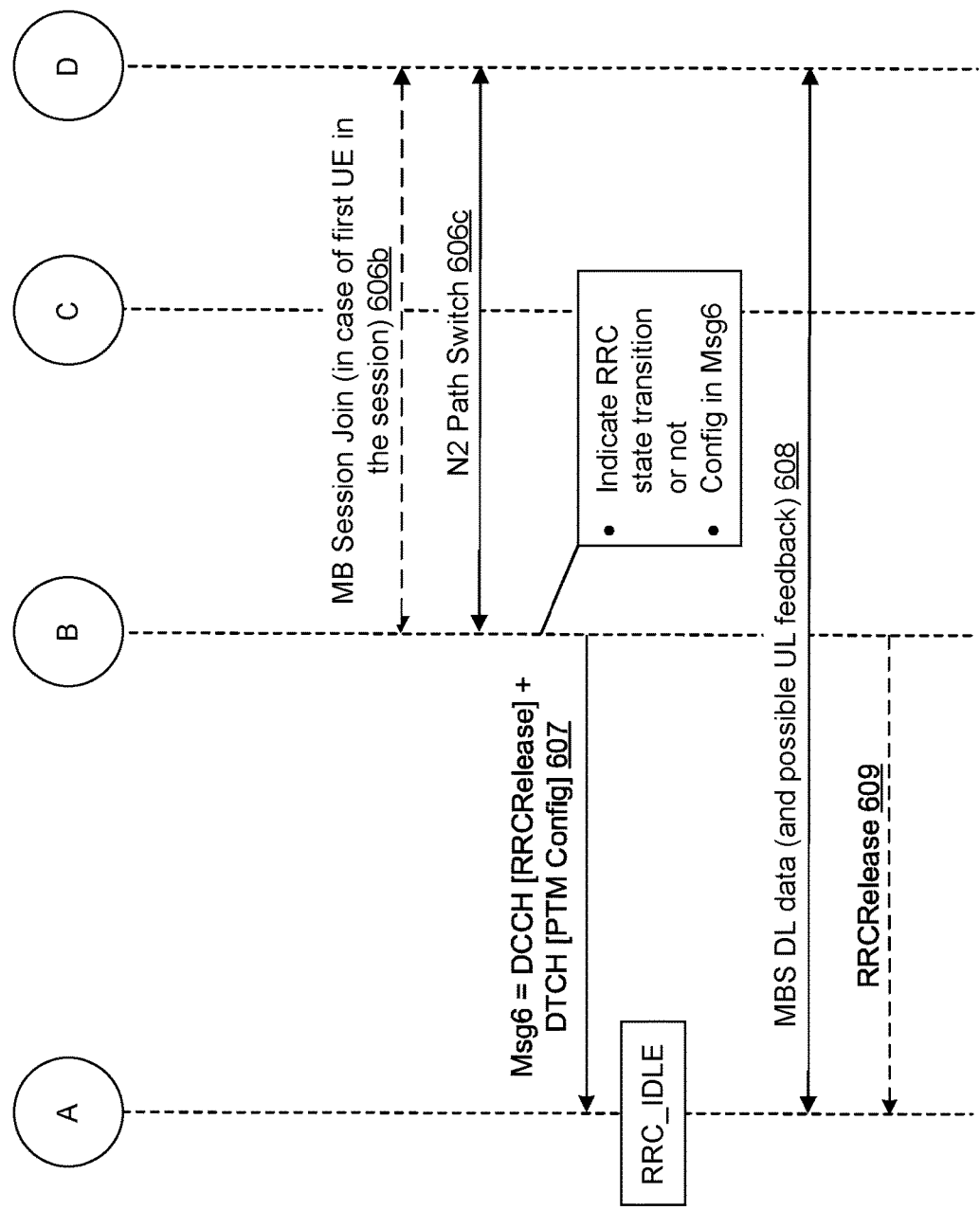
FIG. 6 (Contd.,)

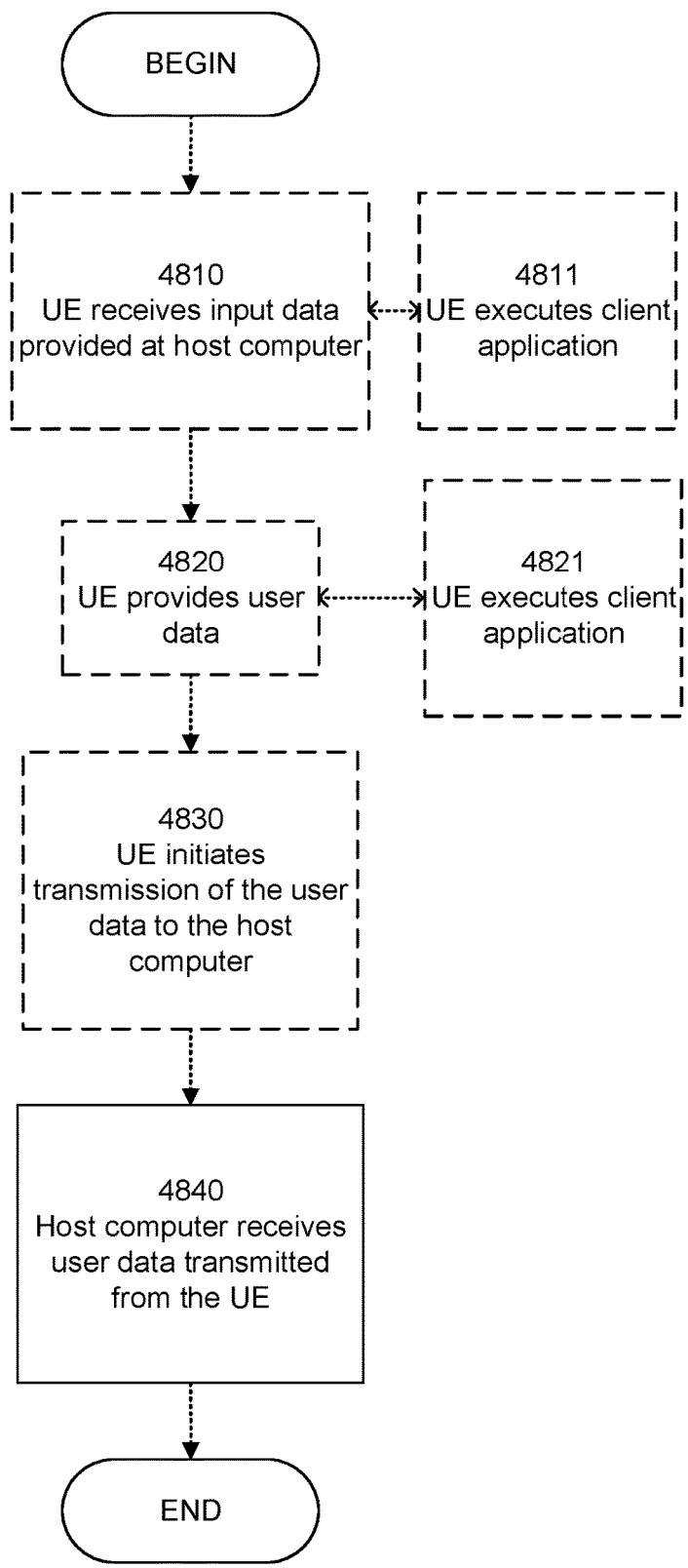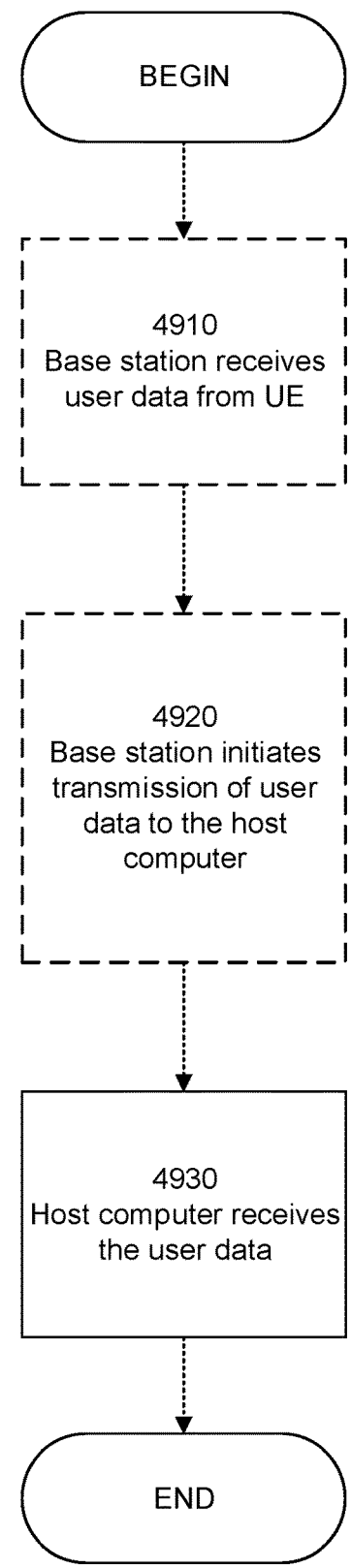
FIG. 17
FIG. 18

CONTINUITY OF MULTICAST AND BROADCAST SERVICES FOR USER EQUIPMENTS IN MOBILITY

CROSS REFERENCE TO RELATED APPLICATIONS

This application is a 35 U.S.C. § 371 national stage application of PCT International Application No. PCT/EP2021/068075 filed on Jun. 30, 2021, which in turn claims domestic priority to U.S. Provisional Patent Application No. 63/046,582, filed on Jun. 30, 2020, the disclosures and content of which are incorporated by reference herein in their entirety.

TECHNICAL FIELD

The present disclosure relates generally to the field of wireless communication. More particularly, it relates to method, user equipment, UE, network node and computer program products for providing continuity of multicast and broadcast services, MBS, to one or more UEs in mobility.

BACKGROUND

With the rapid development of the Internet and the popularization of large-screen multi-function mobile terminals, a large number of mobile data multimedia services and various high bandwidth multimedia services have emerged, such as a video conferencing, television broadcasting, video on demand, advertising, online education and interactive games. In particular, these mobile data multimedia services require that multiple users can receive the same data at the same time. Compared with common data services, the mobile data multimedia services have the characteristics of large data volume, long duration, sensitivity to delay and the like.

In order to make effective use of mobile network resources, the 3rd Generation Partnership Project, 3GPP, proposes a multimedia broadcast multicast service, MBMS, which is a technology for transmitting data to multiple target mobile terminals from one data source.

The MBMS defined by the 3GPP can not only achieve multicast and broadcast of low-rate plain text message, but also can achieve broadcast and multicast of high-speed multimedia services, and thus can provide a wide range of rich video, audio and multimedia services. The MBMS is transmitted over a point-to-Multipoint, PTM interface designed to provide efficient delivery of broadcast and multicast services within a 3GPP cellular network. When MBMS services are broadcasted, all cells inside a multimedia broadcast multicast service single frequency network, MBSFN, area transmit the same MBMS service.

Users access these services and obtain the MBMS content through wireless communication devices such as cellular phones, tablets, laptops, and other devices with wireless transceivers that communicate with the base stations within the wireless communication system. The base stations, sometimes referred to as eNodeBs provide wireless services to the wireless communication devices, sometimes referred to as user equipment UE, within cells.

The UEs may be in one of at least two modes including a connected mode and an idle mode. A UE is in connected mode when a radio resource control, RRC, connection has been established. If no RRC connection is established, the UE is in the idle mode. Therefore, the connected mode comprises an established RRC connection, while there is no established RRC Connection in the Idle mode. The UEs receive the MBMS content in connected mode after establishing the RRC connection. Third Generation Partnership Project, 3GPP, has defined support of multicast and broadcast services in new radio systems, NR, systems, in technical specifications, TS 38.300, TS 38.331, TS 38.413, TS 38.423, TS23.501 and TS23.502.

In existing NR, specification, there is no broadcast or multicast feature for PTM transmissions to the UEs and the available point-to-point transmission can be extended for PTM transmissions to the UEs in RRC CONNECTED state. As there is no broadcast or multicast feature for PTM transmissions to the UEs in NR systems, there is no mobility support for providing continued MBS services to the UEs.

Consequently, there is a need for an improved method and arrangement for providing multicast and broadcast services, MBS, to the UEs in mobility that alleviates at least some of the above cited problems.

SUMMARY

Especially, when user equipments, UEs, are in mobility, it is desired to provide service continuity of MBS services for the UEs which are in RRC_CONNECTED state and in RRC_IDLE or INACTIVE state. In addition to service continuity, providing MBS services to the UEs in mobility may be beneficial, for example, for conserving battery life of the UEs. Therefore, it is desirable to enable the UEs to continue receiving the same MBS service in a new gNB with minimal interruption. In order to provide service continuity for MBS services, the UE needs to acquire the PTM configuration information at a target network node, which is necessary to receive the same MBS, the UE was receiving from a last serving network node. It is therefore an object of the present disclosure to provide a method, a network node, a user equipment, and a computer program product for transmission of multicast and broadcast services, MBS, during mobility that seeks to mitigate, alleviate, or eliminate all or at least some of the above-discussed drawbacks of presently known solutions.

This and other objects are achieved by means of a method, a computer program product, and a device as defined in the appended claims. The term exemplary is in the present context to be understood as serving as an instance, example or illustration.

According to a first aspect of the present disclosure, a method for transmission of multicast and broadcast services, MBS, to a user equipment, UE, in a wireless communication network is provided. The method is performed by a target network node in the wireless communication network. The method comprises determining that the UE is involved in a MBS session with a source network node. Upon determining that the UE is involved in the MBS session with the source network node, the method comprises obtaining a MBS context of the UE related to the MBS session. Further, the method comprises determining provisioning of a Point-To-Multipoint, PTM, configuration information associated with the MBS session to be acquired by the UE for enabling continuous reception of MBS data from the target network node.

In some embodiments, the method further comprising deciding a RRC state of the one or more UEs for reception of MBS data based on one or more of: one or more network parameters for the MBS, capability information of the one or more UEs and one or more MBS parameters.

In some embodiments, the method comprises receiving, from the UE, a message indicating that the UE is involved in a MBS session with the source network node.

In some embodiments, the message is one of: a message A, MSG A, a message 3, MSG 3 and a message 5, MSG 5 of a random access procedure.

In some embodiments, the MSG 3 comprises one or more of: a RRC setup request with a cause, RRC resume request with a cause, RRC system information request, and one or more temporary mobile group identifiers, TMGIs.

In some embodiments, the MSG 5 comprises one or more of: a RRC setup complete message comprising TMGIs and a RRC resume complete message comprising TMGIs.

In some embodiments, the method further comprising receiving from a source network node a HANDOVER request message comprising the MBS context of the UE related to the MBS session when the UE is in the RRC CONNECTED state.

In some embodiments, the MBS context of the UE related to the MBS session comprises one or more of: a UE identifier; a session identifier, a temporary mobile group identity, TMGI, and a source network node identifier.

In some embodiments, the step of obtaining the MBS context of the UE related to the MBS session when the UE is involved in the MBS session with the source network node comprises obtaining the MBS context from one or more of: the source network node and an access and mobility management function, AMF in a core network, CN.

In some embodiments, the step of obtaining the MBS context from the source network node comprises determining that the UE is in the RRC INACTIVE state. The method comprises receiving a resume identity related to the MBS session from the UE. Further, the method comprises transmitting the resume identity to the source network node to identify the MBS context of the UE at the source network node. The method comprises obtaining the MBS context of the UE from the source network node.

In some embodiments, the step of obtaining the MBS context of the UE related to the MBS session from the AMF in the CN comprises determining that the UE is in the RRC IDLE state.

Further, the method comprises receiving information related to the MBS session, said information comprising one or more of: a serving temporary mobile subscriber identity, S-TMSI, a temporary mobile group identity, TMGI, and a session identifier, ID, from the UE. Further, the method comprises performing a RRC connection establishment with the AMF by transmitting an INITIAL UE MESSAGE to the AMF and transmitting the TMGI associated with the UE to the AMF. The method comprises determining that MBS context of the UE is available at the AMF. Further, the method comprises obtaining the MBS context of the UE in a NGAP message when the MBS context is available at the AMF.

In some embodiments, the method further comprising determining that the MBS context of the UE is unavailable at the AMF and receiving an indication from the AMF to initiate a new session for the UE when the MBS context of the UE is unavailable at the AMF.

In some embodiments, the PTM configuration information comprises PTM configuration for the MBS session, said PTM configuration for the MBS session comprising one or more of: a service identifier, a session identifier, a group radio network temporary identifier, G-RNTI, information related to scheduling of PTM data, information indicating at least one neighbouring node transmitting the MBS session, PTM configuration for a cell served by the target network node and PTM configuration for one or more MBS sessions in the target network node.

In some embodiments, the step of transmitting the PTM configuration information associated with the MBS session comprises transmitting the PTM configuration to the UE 103 in a message B, MSG B or message 4, MSG 4. Further, the method comprises transmitting the PTM configuration to the UE in a message 6, MSG 6, and transmitting the PTM configuration to the source network node in a HANDOVER request ACKNOWLEDGE message comprising a MBS configuration information when the HANDOVER request message is received from the source network node.

In some embodiments, the MSG B or the MSG 4 comprises one or more of: a system information block, SIB, indicating the PTM configuration information, a new information element, IE indicating the PTM configuration information, an indication whether or not to change RRC state for continuing the reception of MBS data from the target network node, an indication for resuming a suspended PTP radio bearer when the UE is in RRC INACTIVE state and an indication for configuring a new PTP radio bearer when the UE is in RRC CONNECTED state.

In some embodiments, the MSG6 comprises one or more of: an indication whether or not to change a RRC state for continuing the reception of MBS data from the target network node and an indication whether to use a PTP radio bearer or a PTM radio bearer for reception of MBS data.

In some embodiments, the method further comprising determining that the MBS session of the UE is provided to one or more additional UEs in an area served by the target network node, wherein the MBS session is provided to the one or more additional UEs (103a-103n) using a Point-To-Point, PTP bearer. The method comprising deciding to switch the PTP bearer to a PTM bearer to the one or more additional UEs. Further, the method comprising determining to provision the PTM configuration to the one or more additional UEs for transmission of the MBS data to the UE.

In some embodiments, the method further comprising determining that the MBS session of the UE is not provided to the one or more additional UEs in the area served by the target network node. Further, the method comprising initiating a new MBS session join procedure with AMF and transmitting to the UE, an indication to use a PTP bearer for provisioning of PTM configuration for reception of the MBS data.

According to a second aspect of the present disclosure, a method for enabling a user equipment, UE, in a wireless communication network to perform continuous reception of Multicast and Broadcast services, MBS is provided. The method is performed by a source network node in the wireless communication network. The method comprises determining that the UE is in mobility and involved in a MBS session with the source network node and transmitting a MBS context related to the MBS session to one or more neighbouring network nodes while the UE is in mobility, wherein one of the one or more neighbouring network nodes is a target network node.

In some embodiments, the step of transmitting a MBS context related to the MBS session to one or more neighboring network nodes while the UE is in mobility comprises determining that the UE is in a RRC CONNECTED state during mobility and receiving a HANDOVER request message from the UE. Further, the method comprising transmitting the HANDOVER request message comprising the MBS context of the UE related to the MBS session to one or more neighboring network nodes.

In some embodiments, the method further comprising receiving a PTM configuration from one or more neighboring network nodes in a HANDOVER request ACKNOWLEDGE message comprising configuration information of the MBS session and transmitting a RRC reconfiguration message comprising the configuration information of the MBS session to the UE.

In some embodiments, the PTM configuration information comprises PTM configuration for the MBS session, said PTM configuration for the MBS session comprising one or more of: a service identifier, a session identifier, a group radio network temporary identifier, G-RNTI, information related to scheduling of PTM data and information indicating at least one neighboring node transmitting the MBS session.

In some embodiments, the MBS context is identified using a context identifier assigned by the source network node.

According to a third aspect of the present disclosure, a method for reception of Multicast and Broadcast services, MBS, from a target network node in a wireless communication network is provided. The method is performed by a user equipment, UE in the wireless communication network. The method comprises determining that a MBS session is ongoing at the UE with a source network node. Further, the method comprises transmitting a message indicating that the MBS session is ongoing with the source network node and determining to receive a Point-To-Multipoint, PTM, configuration information associated with the MBS session to be acquired for continuous reception of MBS data from a target network node based on the transmitted message.

In some embodiments, the step of transmitting a message indicating that the UE the MBS session is ongoing with the source network node, further comprising transmitting, to the target network node, the message indicating that the UE is involved in the MBS session with the source network node while the UE is in one of the IDLE state and the INACTIVE state.

In some embodiments, the message is one of: message B or a message 3, MSG 3, and a message 5, MSG 5, of a random access procedure.

In some embodiments, the MSG B or the MSG 3 comprises one or more of: a RRC setup request with a cause, RRC resume request with a cause, RRC system information request, an indication and one or more temporary mobile group identifiers, TMGIs.

In some embodiments, the MSG 5 comprises one or more of: a RRC setup complete message comprising TMGIs and a RRC resume complete message comprising TMGIs.

In some embodiments, the method further comprising transmitting to a source network node a HANDOVER request message comprising the MBS context of the UE related to the MBS session while the UE is in the RRC CONNECTED state.

In some embodiments, the MBS context of the UE related to the MBS session comprises one or more of: a UE identifier; a session identifier, a temporary mobile group identity, TMGI, and a source node identifier.

In some embodiments, the PTM configuration information comprises PTM configuration for the MBS session, said PTM configuration for the MBS session comprising one or more of: a service identifier, a session identifier, a group radio network temporary identifier, G-RNTI, information related to scheduling of PTM data, information indicating at least one neighboring node transmitting the MBS session and PTM configuration information for one or more ongoing MBS sessions in a cell served by the target node.

In some embodiments, the step of receiving the PTM configuration information associated with the MBS session from the target network node comprises receiving the PTM configuration in a message B, MSG B, a message 4, MSG 4, receiving the PTM configuration in a message 6, MSG 6 procedure and receiving the PTM configuration from the source network node in a HANDOVER request ACKNOWLEDGE message comprising a MBS configuration information.

In some embodiments, the MSG4 comprises one or more of: a system information block, SIB, indicating the PTM configuration information, a new information element, IE indicating the PTM configuration information, an indication whether or not to change RRC state for continuing the reception of MBS data from the target network node, an indication for resuming a suspended PTP radio bearer when the UE is in RRC INACTIVE state and an indication for configuring a new PTP radio bearer when the UE is in RRC CONNECTED state.

In some embodiments, the MSG6 comprises one or more of: an indication whether or not to change a RRC state for continuing the reception of MBS data from the target network node and an indication whether to use a PTP radio bearer or a PTM radio bearer for reception of MBS data.

According to a fourth aspect of the present disclosure, a target network node for transmission of Multicast and Broadcast services, MBS, to a user equipment, UE in a wireless communication network is provided. The target network node being adapted for determining that the UE is involved in a MBS session with a source network node. When the target network node determines that the UE is involved in a MBS session with the source network node, the target network node being adapted for obtaining a MBS context of the UE related to the MBS session and transmitting a Point-To-Multipoint, PTM, configuration information associated with the MBS session to be acquired by the UE for enabling continuous reception of MBS data from the target network node.

According to a fifth aspect of the present disclosure, a source network node for enabling a user equipment, UE, in a wireless communication network to perform continuous reception of Multicast and Broadcast services, MBS is provided. The source network node being adapted for determining that the UE is in mobility and involved in a MBS session with the source network node. Further, the source network node being adapted for transmitting a MBS context related to the MBS session to one or more neighboring network nodes while the UE is in mobility, wherein one of the one or more neighbouring network nodes is a target network node.

According to a sixth aspect of the present disclosure, a user equipment, UE, for reception of Multicast and Broadcast services, MBS, from a target network node in a wireless communication network is provided. The UE being adapted for determining that a MBS session is ongoing at the UE with a source network node. Further, the UE being adapted for transmitting a message indicating that the MBS session is ongoing with the source network node and receiving a Point-To-Multipoint, PTM, configuration information associated with the MBS session to be acquired for continuous reception of MBS data from a target network node based on the transmitted message.

According to a seventh aspect of the present disclosure, there is provided a computer program product comprising a non-transitory computer readable medium, having thereon a computer program comprising program instructions. The computer program is loadable into a data processing unit and configured to cause execution of the method according to any of the first, second and third aspects when the computer program is run by the data processing unit.

An advantage of some embodiments is that the service continuity of MBS is maintained for the UEs in mobility.

An advantage of some embodiments is to enable the UEs to acquire PTM configuration information of multicast or broadcast services for the UEs which are RRC IDLE or RRC INACTIVE state without the need for transitioning into RRC CONNECTED state.

An advantage of some embodiments is that efficient handling of MBS context transfer of the UE to avoid the need of a new session join with another MBS context at the target network node.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

FIG. 17 is a block diagram of methods implemented in a communication system including a host computer, a base station, and a UE;

FIG. 18 is a block diagram of methods implemented in a communication system including a host computer, a base station, and a UE.

DETAILED DESCRIPTION

Figure 1:
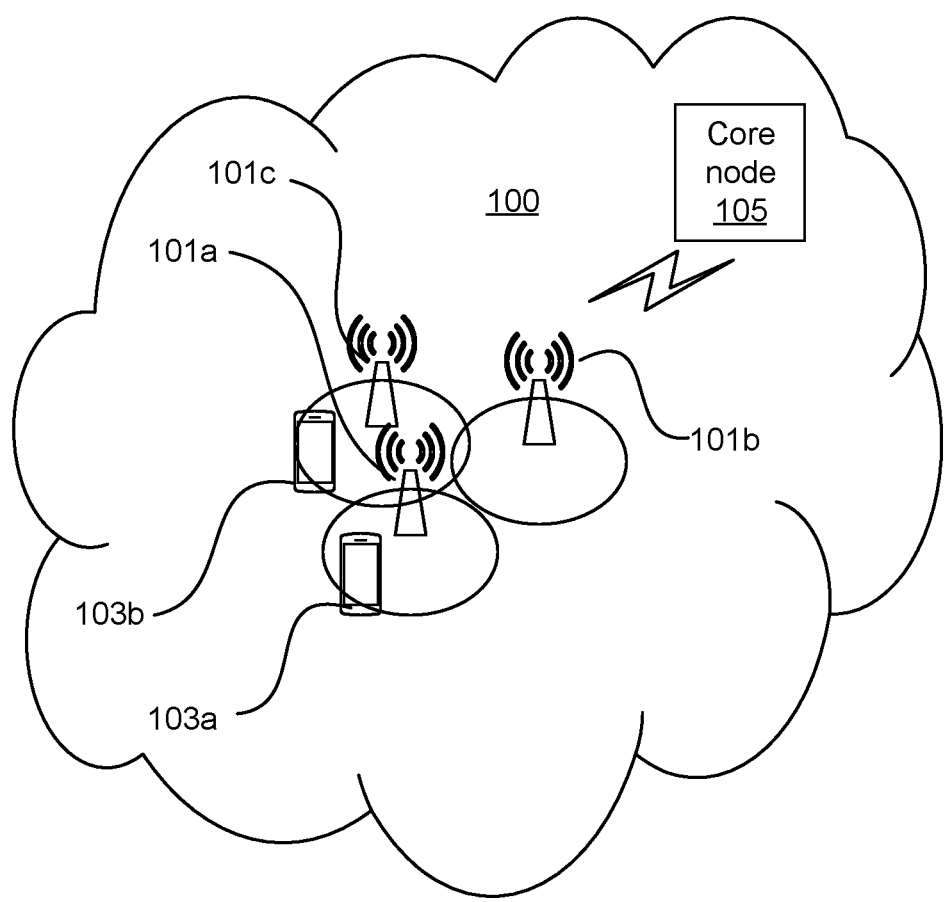
FIG. 1 discloses an example wireless communication network.

Aspects of the present disclosure will be described more fully hereinafter with reference to the accompanying drawings. The apparatus and method disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the invention. It should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

It will be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

In the present disclosure, user equipments, UEs, also known as mobile terminals, and/or wireless terminals are enabled to communicate wirelessly with a network node in a wireless communication network.

Typically, a network node may serve or cover one or several cells of the wireless communication network. The network node may be a source network node or a target network node. The source network node serves the UE initially and when the UE performs a handover from the source network node to the target network node, the target network node serves the UE after the UE performs the handover to the target network node. Thus, the network node may be a source network node or a target network node. In general, the network node provides radio coverage in the cell(s) and communicates over an air interface with the UE(s) operating on radio frequencies within its range. The network node may be also referred to as "eNB", "eNodeB", "NodeB" or "gNB", depending on the technology and terminology used. In the present disclosure, the network node may also be referred to as a base station, BS.

In the present disclosure, it is assumed that connection establishment has already been completed between the UE(s) and the network nodes.

Throughout the description, the terms "INACTIVE" state and "RRC INACTIVE" shall have the same meaning and the terms "IDLE" state and "RRC IDLE" state shall have the same meaning.

In the following description of exemplary embodiments, the same reference numerals denote the same or similar components.

FIG. 1 discloses an example wireless communication network 100. As depicted in FIG. 1, the wireless communication network 100 includes a plurality of radio access nodes, RANs 101a, 101b, 101c, such as gNBs, gNBs-distributed units (gNBs-DUs) or network nodes or other types of wireless access points, each defining a corresponding coverage area. Each RAN 101a, 101b, 101c is connectable to a core network node 105 (i.e., a core node or CN) over a wired or wireless connection.

In some embodiments, a first RAN 101a is a source network node configured to wirelessly connect to the UE 103a.

In some embodiments, second RAN 101b is a target network node. For example, the target network node may be any of the neighbouring RANs to the first RAN 101a, i.e., network node 101b or network node 101c.

While a plurality of UEs 103a, 103b are illustrated in this example, the disclosed embodiments are equally applicable to a situation where a single UE is in the corresponding coverage area or where a single UE is connecting to the corresponding RAN. Therefore, it should be noted that there can be a plurality of UEs 103a-103n (not shown in FIG. 1), a single UE may be referred as a UE 103 in some embodiments of this disclosure.

The source network node 101a and the target network node 101b may be for example a new radio, NR, base station i.e., a gNB or an evolved node base station i.e., eNB, or the like. The communication from the source network node 101a or the target network node 101b to the UEs 103a and 103b is referred to as downlink, DL, communication, whereas communication from the UEs 103a and 103b to the source network node 101a or the target network node 101b is referred to as uplink, UL, communication. Thus, the UEs 103a and 103b involve in bidirectional radio communication with the source network node 101a or the target network node 101b.

The source network node 101a or the target network node 101b comprises a scheduler for dynamically scheduling downlink transmissions. The scheduler dynamically allocates resources for Physical Downlink Shared Channel, PDSCH, and sends scheduling information to the UEs 103a and 103b through a control channel.

In order to make effective use of mobile network resources, the 3rd Generation Partnership Project, 3GPP, proposes a multimedia broadcast multicast service, MBMS, which is a technology for transmitting data to multiple target mobile terminals from one data source.

The MBMS defined by the 3GPP can not only achieve multicast and broadcast of low-rate plain text message, but also can achieve broadcast and multicast of high-speed multimedia services, and thus can provide a wide range of rich video, audio and multimedia services. The MBMS is transmitted over a point-to-Multipoint, PTM interface designed to provide efficient delivery of broadcast and multicast services within a 3GPP cellular network.

The UEs 103a and 103b may be in one of at least two modes including a connected mode and an idle mode. For example, the UE 103a is in connected mode when a radio resource control, RRC, connection has been established with the source network node. If no RRC connection is established, the UE is 103a in the idle mode. Therefore, the connected mode comprises an established RRC connection, while there is no established RRC connection in the Idle mode. The UEs 103a and 103b receive the MBMS content in connected mode after establishing the RRC connection.

In existing new radio, NR, specification, there is no broadcast or multicast feature for PTM transmissions to the UEs and the available point-to-point transmission can be extended for PTM transmissions to the UEs 103a and 103b in RRC CONNECTED state. As there is no broadcast or multicast feature for PTM transmissions to the UEs 103a and 103b in NR systems, there is no mobility support for providing continued MBS services to the UEs.

Especially, when the UEs 103a and 103b are in mobility, it is desired to provide service continuity of MBS services for the UEs 103a and 103b which are in RRC_CONNECTED state and in RRC_IDLE or INACTIVE state. In addition to service continuity, providing MBS services to the UEs 103a and 103b in mobility may be beneficial, for example, for conserving battery life of the UEs 103a and 103b. Therefore, it is desirable to enable the UEs 103a and 103b to continue receiving the same MBS service in the target network node 101b with minimal interruption.

In order to provide service continuity for MBS services, the UE needs to acquire the PTM configuration information at the target network node 101b, which is necessary to receive the same MBS, the UE 103a was receiving from the serving network node 101a.

Therefore, according to some embodiments of the present disclosure, the target network node 101b implements a method for transmission of MBS to the UE 103a as described herein. Alternatively, the UE 103a may also implement a method for reception of MBS data from the target network node 101b.

According to some embodiments of the present disclosure, the target network node 101b determines that the UE 103a is involved in a MBS session with the source network node 101a. For example, when the UE 103a being served by the source network node 101a, the UE 103b may be involved in the MBS session with the source network node 101a. The target network node 101b may determine that the UE 103 is in one of: an RRC IDLE state, an RRC INACTIVE state and a RRC connected state. Further, the target network node 101b may receive a message from the UE 103b, which indicates that the UE is involved in the MBS session with the source network node 101a when the UE is in one of the IDLE state and the INACTIVE state. In some examples, the message from the UE 103 may be a message 3, MSG 3 or a message 5 of a random access procedure.

When the target network node 101b determines that the UE 103 is involved in the MBS session with the source network node 101a, the target network node 101b obtains a MBS context related to the MBS session. For example, the MBS context of the UE related to the MBS session comprises an identifier of the UE 103, a session identifier, a temporary mobile group identity, TMGI, and a source network node identifier.

After obtaining the MBS context related to the MBS session, the target network node 101b transmits a Point-To-Multipoint, PTM, configuration information associated with the MBS session. The PTM configuration information is to be acquired by the UE 103, which enables the UE 103 for continuous reception of MBS data from the target network node 101b.

In some examples, the PTM configuration information comprises one or more of: a service identifier, ID, for the MBS, a session ID for the MBS, a group radio network temporary identifier, G-RNTI, information related to scheduling of PTM data, information indicating at least one neighbouring node transmitting the MBS session, PTM configuration for a cell served by the target network node and PTM configuration for one or more MBS sessions in the target network node.

In an example, target network node 101*b* transmits the PTM configuration information to the UE in a message 4, MSG 4 when the UE is in the RRC INACTIVE state.

In another example, the target network node 101*b* transmits the PTM configuration information to the UE in a message 6, MSG 6 when the UE is in the RRC IDLE state.

In yet another example, the target network node 101*b* transmits the PTM configuration information to the source network node 101*a*, for example in a HANDOVER request ACKNOWLEDGE message and the source network node 101*a* transmits the PTM configuration information to the UE 103.

Therefore, the UE 103 acquires the PTM configuration information from the target network node 101*b* for continuing the reception of MBS services from the target network node 101*a*. Various embodiments in which the UE receives the PTM configuration for continuing the reception of MBS data are explained in the later parts of the description.

Figure 2:
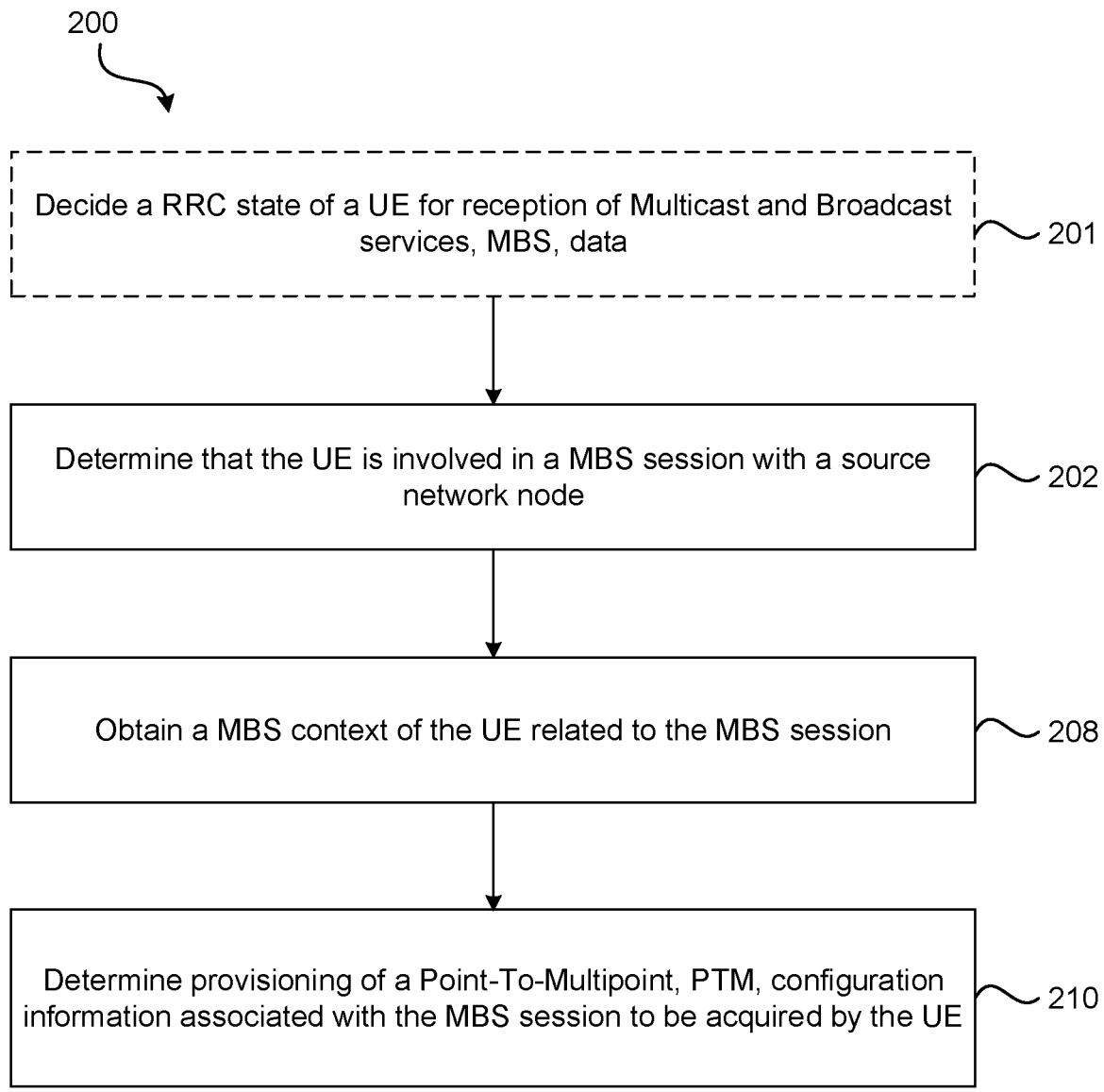
FIG. 2 is a flowchart illustrating example method steps of a method performed by a target network node for transmission of multicast and broadcast services, MBS, to a user equipment, UE, in a wireless communication network.

FIG. 2 is a flowchart illustrating an example method 200 for transmission of multicast and broadcast services, MBS, to the UE(s) in the wireless communication network. As stated above, the target network node performs the method 200 for providing MBS, to the UE in the wireless communication network.

The MBS data or MBS content, referred to herein as PTM compatible service, which may be a service, data, or a program that can be accessed through the UEs. Examples of PTM compatible services include streaming audio and video and other multimedia data.

The UEs as shown in the FIG. 1, may be in one of the following modes including an idle mode, inactive mode and a connected mode. When operating in accordance with a 3GPP communication specification, operations are defined for at least an idle mode and a connected mode. For the example, two of the UEs may be in idle mode and are referred to as idle mode UEs. Further, some of the UEs may also be in connected mode that are referred to as connected mode UEs. The connected mode UEs differ from Idle mode UEs in at least that the connected mode UEs have an established RRC connection as defined by the particular 3GPP specification and the idle mode UEs do not have an established RRC connection.

Furthermore, some of the UEs in the wireless communication network 100 as shown in FIG. 1, may be in INACTIVE state, wherein these UEs be in INACTIVE state for a particular or a predefined time interval, may be configured by the RAN or the network node, when there is no data reception at these UEs.

The embodiments disclosed herein are more applicable for transmission of MBS to the UEs, when the UE(s) perform a handover from the source network node 101*a* to the target network node and also when the UE(s) are in one of the idle state, INACTIVE state and CONNECTED state.

At step 202, the method 200 comprises determining that the UE is involved in a MBS session with the source network node. For example, the UE may be involved in communication with the source network node. When the UE is involved in communication with the source network node, the UE may be involved in MBS session with the source network node. The UE may be in mobility when the UE is involved in MBS session with the source network node. During the mobility while being involved in MBS session with the source network node, the UE may perform a handover to the target network node from the source network node with the target network node.

In some embodiments, the UE may be in any of the states such as IDLE state, INACTIVE state or the CONNECTED state during the mobility while being involved in MBS session with the source network node.

After performing the handover by the UE to the target network node, the target network node determines that the UE is involved in the MBS session with the source network node for example, to continue the MBS session for the UE at the target network node.

In some embodiments, the target network node 101*b* may receive a message from the UE which indicates that the UE is involved in the MBS session with the source network node when the UE is in one of the IDLE state and the INACTIVE state. In some examples, the message from the UE may be a message 3, MSG 3 or a message 5 of a random access procedure.

For example, the MSG 3 comprises one or more of: a RRC setup request with a cause, RRC resume request with a cause, RRC system information request, and one or more TMGIs and the MSG 5 comprises one or more of: a RRC setup complete message comprising TMGIs and a RRC resume complete message comprising TMGIs.

In some examples, the target network node determines the UE(s) which are either in IDLE state or INACTIVE state or CONNECTED state for transmission of the MBS data to the UE(s) which are in the IDLE state or the INACTIVE state.

Although the target network node determines the UE(s) which are either in IDLE state/the INACTIVE state or CONNECTED state for continuing the transmission of the MBS data to the UE(s), the target network node may decide a RRC state of the UE(s) for continuing transmission of the MBS data as specified in the optional step 201. For example, the target network node may determine the RRC state of the UE(s) based on one or more network parameters for the MBS, capability information of the UE(s) and one or more MBS parameters, capability information of the one or more UE(s) and one or more MBS parameters.

In some examples, if the target network node determines that the MBS data is only to be received in CONNECTED state, then the target network node decides the one or more UEs to be in the CONNECTED state for reception of MBS data.

In another example, if the target network node determines that there are large number of UEs, which is equal to the maximum number of UEs that can receive the MBS data in the CONNECTED state, then the base station may decide the one or more UEs to be IDLE state or INACTIVE state for reception of MBS data.

In another example, if the capability information of the UE(s) indicate that the UE(s) may not receive the MBS data in the IDLE state or INACTIVE state, then the target network node may decide the RRC state of the UE(s) for reception of the MBS data. Thus, the target network node may decide the RRC state of the one or more UEs based on network parameters for the MBS, the capability information of the one or more UEs and the one or more MBS parameters.

At step 208, the method 200 comprises obtaining the MBS context of the UE related to the MBS session. For example, the MBS context of the UE represents the MBS context related to the MBS session that the UE was involved with the source network node. The MBS context of the UE may include an identifier of the UE, a session identifier associated with the MBS session, a TMGI and a source network node identifier.

In an embodiment, the target network node may obtain the MBS context of the UE from the UE. In another embodiment, the target network node may obtain the MBS context of the UE from the source network node. In yet another embodiment, the target network node may obtain the MBS context of the UE from the AMF in the core network.

In some embodiments, the target network node may determine whether the UE is in IDLE state or INACTIVE state for obtaining the MBS context of the UE. If the target network node determines that the UE is in INACTIVE state, the target network node may receive a resume identity related to the MBS session from the UE. Further, the target network node may transmit the resume identity to the source network node for identifying the MBS context of the UE at the source network node. The source network nod identifies the MBS context of the UE using the resume identity received from the target network node and transmits the identified MBS context of the UE to the target network node. Thus, the target network node obtains the MBS context.

In another embodiment, when the target network node determines that the UE is in IDLE state, the target network node may receive information related to the MBS session comprising a serving temporary mobile subscriber identity, S-TMSI, a temporary mobile group identity, TMGI, and a session identifier, ID, from the UE. Further, the target network node may perform a RRC connection establishment with the AMF by transmitting an INITIAL UE MESSAGE to the AMF and transmits the TMGI associated with the UE to the AMF. With the TMGI received from the target network node, the AMF identifies the MBS context stored at the AMF. If the MBS context is available at the AMF, the AMF transmits the MBS context of the UE in a NGAP message. Thus, the target network node obtains the MBS context of the UE when the MBS context is available at the AMF.

If the MBS context is unavailable at the AMF, then the AMF may transmit an indication to the target network node to initiate a new MBS session for the UE. Therefore, the target network node may receive an indication from the AMF to initiate a new MBS session for the UE when the MBS context of the UE is unavailable at the AMF.

Thus, the target network node may obtain the MBS context of the UE using any of the above mentioned examples as described above.

At step 210, the method 200 comprises determining provisioning of the PTM configuration information associated with the MBS session to the UE. The target network node transmits the PTM configuration information associated with the MBS session to the UE. The PTM configuration information is to be acquired by the UE for reception of the MBS data in the IDLE state or the INACTIVE state.

The PTM configuration information comprises PTM configuration for the MBS session comprising a service identifier, a session identifier, a group radio network temporary identifier, G-RNTI, information related to scheduling of PTM data, information indicating at least one neighbouring node transmitting the MBS session, PTM configuration for a cell served by the target network node and PTM configuration for one or more MBS sessions in the target network node.

For example, the target network node may determine whether to provision the PTM configuration information through a control channel. In case, the target network node determines to transmit the PTM configuration information through the control channel, the target network node may transmit the PTM configuration information to the UE through the common control channel. For example, the target network node may transmit the PTM configuration information through a common control channel in a system information block, SIB, which is transmitted periodically by the network node.

In an example, the common control channel is a PTM downlink control channel. In alternative examples, the common control channel can be a new PTM downlink control channel, DCCH, for example, a newly defined multicast broadcast common control channel MBCCH, which may be carried on the physical downlink shared channel, PDSCH, used for PTM. The scheduling information of this common control channel, e.g., repetition period, modification period, first subframe, offset, and DRX parameters that allows UEs to know when to monitor for acquisition of the PTM can be provided in another SIB whose scheduling information is known by the UEs.

In an example, the target network node may transmit the PTM configuration information to the one or more UEs through the common control channel, based on reception of a request for the PTM configuration information from the UE in one of the IDLE state and the INACTIVE state.

In an example, the target network node receives the request for the PTM configuration information from the UE in the IDLE state or the INACTIVE state. In response to the request from the UE for the PTM configuration information, the target network node transmits the PTM configuration information to the UE.

In some examples, the target network node may transmit the PTM configuration to the UE in a message 4, MSG 4 when the UE is in the RRC INACTIVE state. When the PTM configuration is transmitted in the MSG 4, the MSG 4 from the target network node may include: a SIB indicating the PTM configuration information, a new information element, IE, indicating the PTM configuration information, an indication whether the UE need to change RRC state for continuing the reception of MBS data from the target network node, an indication for resuming a suspended PTP radio bearer when the UE is in RRC INACTIVE state.

In some examples, the target network node may transmit the PTM configuration to the UE in a message 6, MSG 6 when the UE is in the RRC IDLE state. When the PTM configuration is transmitted in the MSG 6, the MSG 6 from the target network node may include: an indication whether or not the UE needs to change an RRC state for continuing the reception of MBS data from the target network node and an indication whether to use a PTP radio bearer or a PTM radio bearer for reception of MBS data.

In some examples, the target network node may transmit the PTM configuration to the source network node in a HANDOVER request ACKNOWLEDGE message in response to receiving a HANDOVER request message from the source network node. Further, the source network node transmits the PTM configuration received from the target network node to the UE.

Further, in some embodiments, the target network node may determine that the MBS session of the UE is being provided to one or more additional UEs in an area served by the target network node using a Point-To-Point, PTP bearer. When the target network node determines that the MBS session of the UE is being provided to one or more additional UEs in an area served by the target network node using the PTP bearer, the target network node may decide to switch the PTP bearer to a PTM bearer to the one or more additional UEs. Upon deciding to switch the PTP bearer to a PTM bearer to the one or more additional UEs, the target network node may transmit the PTM configuration to the one or more additional UEs for transmission of the MBS data to the UE. Thus, the additional UEs in the area being served by the target network node along with the UE may receive the continued MBS transmission from the target network node.

In case the target network node determines that the MBS session of the UE is not provided to the one or more additional UEs in the area served by the target network node, then the target network node may initiate a new MBS session join procedure with the AMF. Upon initiating a new MBS session with the UE, the target network node may transmit an indication to the UE to use a PTP bearer for continuing reception of the MBS data from the target network node.

Figure 3:
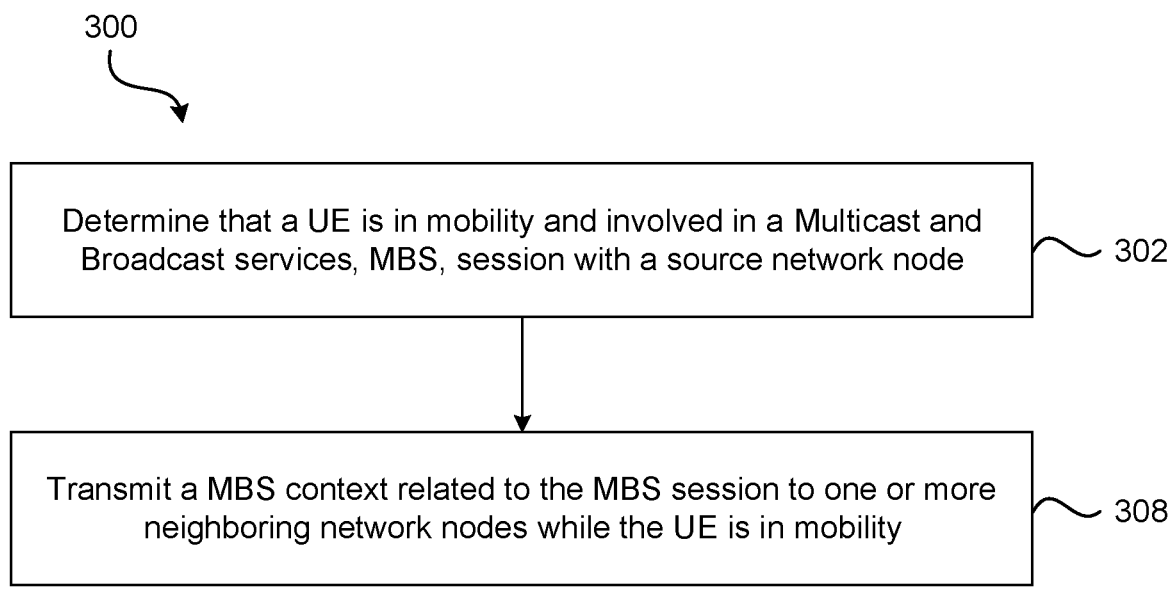
FIG. 3 is a flow chart illustrating example method steps of a method performed by a source network node for enabling the UE for continuous reception of MBS.

FIG. 3 is a flow chart illustrating example method 300 performed by the source network node for enabling the UE for continuous reception of MBS. The source network node allows the handover of the UE to the target network node. Further, the source network node enables the UE to receive the PTM configuration of the target network node in order to continue the reception of MBS data from the target network node.

At step 302, the method 300 comprises determining that the UE is in mobility and involved in the MBS session with the source network node. The source network node may determine the movement or mobility of the UE within or outside the area being covered by the source network node. For example, the source network node 101*a* may allow the UE to perform handover of the UE to any of the neighbouring network nodes i.e., the network nodes 101*b* or 101*c* as shown in the FIG. 1. Thus, any of the neighbouring network nodes of the source network node 101*a* as in the FIG. 1, may be a target network node for the UE for performing the handover from the source network node to the target network node. Further, the source network node may also determine the MBS session of the UE when the UE is being served by the target network node. The source network node may also identify the MBS context of the UE related to the MBS session. Further, the source network node may identify the MBS context of the UE using a context identifier assigned by the source network node.

At step 308, the method 300 comprising transmitting the MBS context related to the MBS session to one or more neighbouring network nodes while the UE is in mobility. The one or more neighbouring network nodes may be target network node for the UE after handover from the source network node. Thus, the source network node transmits the MBS context of the UE to the one or more neighbouring nodes which may be the target network nodes for the UE after handover from the source network node. Thus, the one or more neighbouring network nodes or the target network nodes may receive the MBS context of the UE such that the one or more neighbouring network nodes may receive MBS context of the UE in advance, in order to provide continued MBS to the UE after the handover from the source network node.

In some embodiments, transmitting the MBS context related to the MBS session to one or more neighbouring network nodes while the UE is in mobility comprises determining that the UE is in CONNECTED state during the mobility. When the UE is CONNECTED state, the source network node receives a HANDOVER request message from the UE and transmits a the HANDOVER request message comprising the MBS context of the UE related to the MBS session to the one or more neighbouring network nodes i.e., target network nodes.

Further, the source network node receives the PTM configuration from the one or more neighbouring network nodes in a HANDOVER request ACKNOWLEDGE message comprising configuration information of the MBS session and the source network node transmits a RRC reconfiguration message comprising the configuration information of the MBS session to the UE. Thus, the source network node transmits the RRC reconfiguration message comprising the PTM configuration information of the neighbouring network nodes to the UE for enabling the UE to receive continued MBS transmission from the neighbouring network nodes, i.e., target network nodes.

Figure 4:
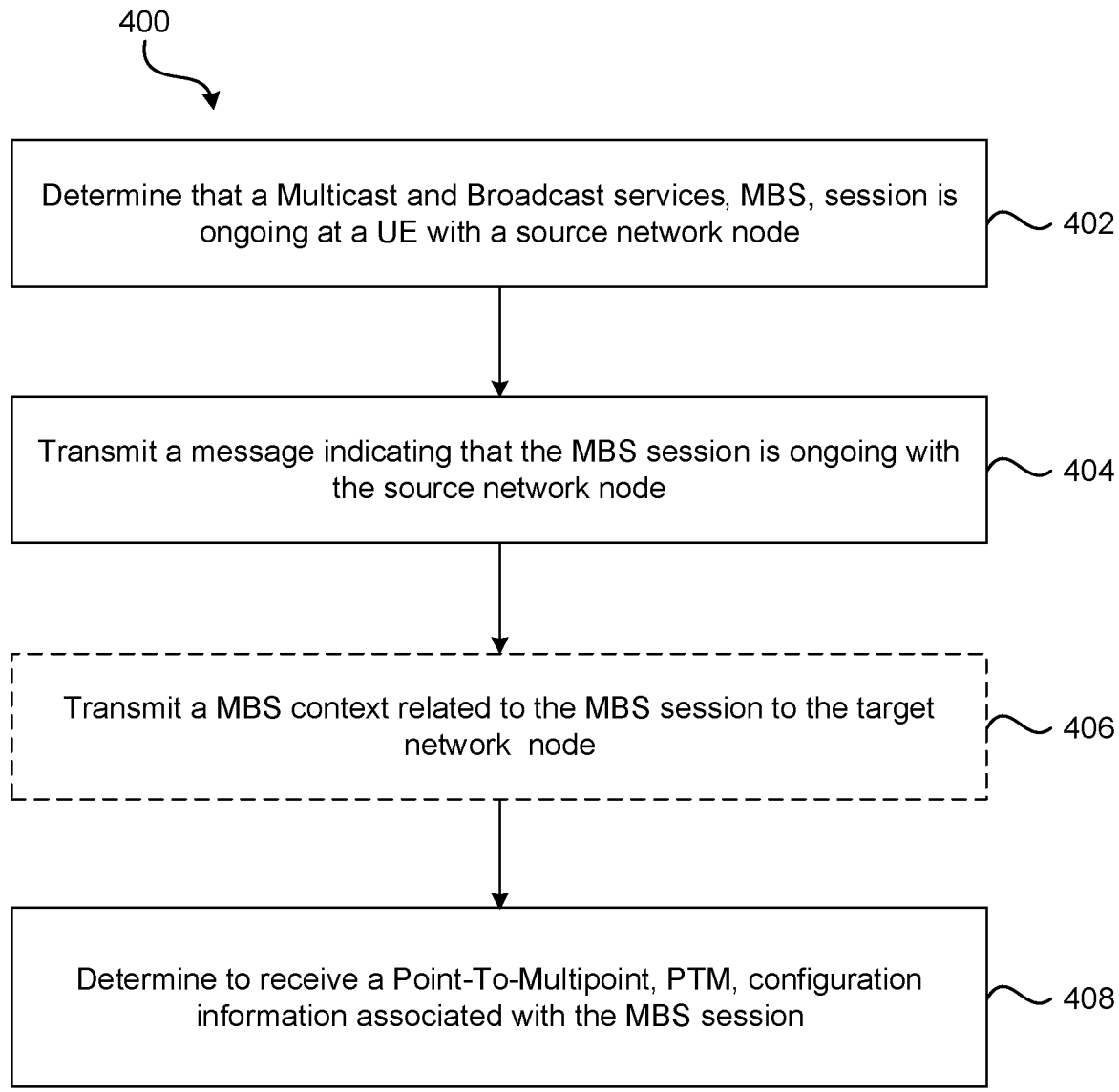
FIG. 4 is a flowchart illustrating example method steps of a method performed by the UE for reception of MBS.

FIG. 4 is a flowchart illustrating example method 400 performed by the UE for reception of MBS. As depicted in the FIG. 1, the UE may be in mobility while being served by the source network node 101*a* for obtaining the MBS from the source network node 101*a*. The UE may perform a handover from the source network node 101*a* to the target network node 101*b* as shown in the FIG. 1. The UE may perform the method 400 for continuing the reception of MBS from the target network node after performing the handover from the source network node to the target network node.

At step 402, the method 400 comprises determining that the MBS session is ongoing at the UE with the source network node. The UE is involved in the MBS session with the source network node when being served by the source network node. Thus, the UE determines the MBS session ongoing with the source network node.

At step 404, the method 400 comprises transmitting a message indicating that the MBS session is ongoing with the source network node. After performing handover to the target network node, the UE transmits a message to the target network node which indicates the target network node that the MBS session is ongoing with the source network node.

In some embodiments, prior to transmitting the message to the target network node, the method comprises determining that the UE is in one of an RRC IDLE state, an RRC INACTIVE state and a RRC connected state. When the UE is in RRC IDLE state or an RRC INACTIVE state, the method comprises transmitting, to the target network node, the message indicating that the UE is involved in the MBS session with the source network node.

In some examples, the message indicating that the MBS session is ongoing with the source network node is transmitted in MSG 3 or MSG 5 of a random access procedure.

When the message is transmitted using MSG 3 of the random access procedure, then the MSG 3 comprises a RRC setup request with a cause, RRC resume request with a cause, RRC system information request, an indication and one or more temporary mobile group identifiers, TMGIs.

When the message is transmitted using MSG 5 of the random access procedure, then the MSG 5 comprises a RRC setup complete message comprising TMGIs and a RRC resume complete message comprising TMGIs. Thus, the message indicating that the UE is involved in MBS session with the source network node may be transmitted using the MSG 3 or MSG 5 of the random access procedure.

In some embodiments, the method 400 comprises transmitting the MBS context related to the MBS session to the target network node as illustrated by the optional step 406. In some examples, the MBS context of the UE related to the MBS session comprises one or more of: a UE identifier, a session identifier, TMGI, and a source node identifier.

In order to transmit the MBS context related to the MBS session, the method 400 comprises determining that the UE is in a RRC IDLE state. When the UE is in IDLE state, the method 400 comprises obtaining MBS session information form the UE and transmitting information related to the MBS session information said transmitted information comprising one or more of: a serving temporary mobile subscriber identity, S-TMSI, a temporary mobile group identity, TMGI, and a session identifier, ID, to the target network node.

At step 408, the method 400 comprises determining to receive PTM configuration information associated with the MBS session. The PTM configuration information of the MBS session comprises a service identifier, a session identifier, a G-RNTI, information related to scheduling of PTM data, information indicating at least one neighbouring node transmitting the MBS session and PTM configuration information for one or more ongoing MBS sessions in a cell served by the target node.

In some examples, the PTM configuration may be received in a MSG 4 of the random access procedure when the UE is in the INACTIVE state. When the PTM configuration is received in a MSG 4, the MSG 4 may include a SIB indicating the PTM configuration information, a new information element, IE indicating the PTM configuration information, an indication whether or not to change RRC state for continuing the reception of MBS data from the target network node, an indication for resuming a suspended PTP radio bearer when the UE is in RRC INACTIVE state and an indication for configuring a new PTP radio bearer when the UE is in RRC CONNECTED state.

In some examples, the PTM configuration is received in a MSG 6 of the random access procedure when the UE is in the IDLE state. When the PTM configuration is received in a MSG 6, the MSG 6 may include an indication whether the UE should change a RRC state for continuing the reception of MBS data from the target network node and an indication whether to use a PTP radio bearer or a PTM radio bearer for reception of MBS data.

In some examples, the PTM configuration is received from the source network node in a HANDOVER request ACKNOWLEDGE message comprising a MBS configuration information.

Thus, the UE may receive the PTM configuration through any of the above described examples for continuing the reception of MBS data from the target network node after handover from the source network node.

Figure 5:
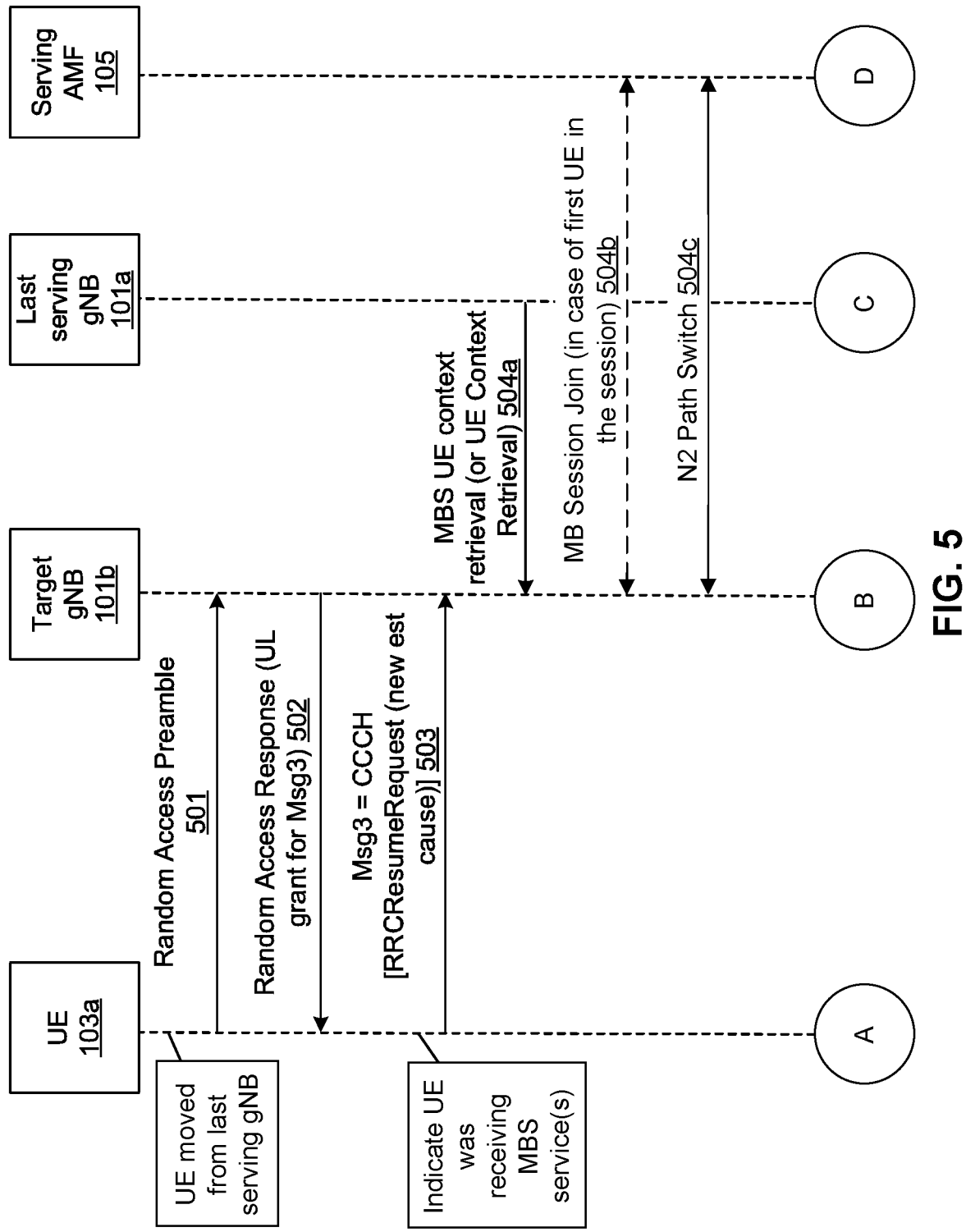
FIG. 5 is a signal flow diagram illustrating example operations in the wireless communication network, initiated by the UE during mobility in a RRC INACTIVE state.

FIG. 5 is a signal flow diagram illustrating example operations in the wireless communication network, initiated by the UE during mobility in a RRC INACTIVE state. In various embodiments of the present disclosure, the UE performs random access at the new RAN node, i.e., the target network nodes and indicates its interest in continuing to receive MBS session(s) and receives corresponding PTM configuration. The PTM configuration to be acquired can contain configuration of only session(s) the UE is interested in or of all ongoing sessions in the cell. The target network node may provide the UE with the PTM configuration with or without moving it to RRC_CONNECTED depending on the load situation and service requirement.

As depicted in FIG. 5, the UE 103*a* during mobility has moved from the source network node and handed over to the target network node 101*b*. The UE performs a random access to the target network node 101*b* and transmits 501 a random access preamble to the target network node 101*b*. The UE 103*a* receives 502 a random access response message from the target network node 101*b*. The random access response message comprises a UL grant for transmitting MSG 3 to the target network node. With the UL grant, the UE 103*a* transmits 503 MSG 3 comprising a cause indicating that the UE is interested in the MBS session that it was receiving from the source network node. The MSG 3 may be transmitted to the target network node 101*b* on a common control channel. Upon receiving the MSG 3 from the UE 103*a*, the target network node may receive 504*a*, the MBS context related to the MBS session from the last serving node 101*a*, which is a source network node, when the MBS context is available at the last serving node 101.

In case when the MBS context of the UE 103*a* related to the MBS session is unavailable at the last serving node 101*a*, then the target network node 101*b* may initiate 504*b* a MBS session join procedure with the AMF 105, in case when the UE 103*a* is a first UE for the MBS session. For example, if the UE 103*a* is the first one interested in a session, the needs to communicate with AMF 105 for joining the session, obtaining MBS session context as well as having NGAP Path switch 504*c* before it can deliver MBS data to the UE 103*a*.

Further, the UE 103*a* receives 505 the PTM configuration from the target network node 101*b* in MSG 4 through a downlink control channel. Further, the target network node 101*b* may indicate the UE in MSG 4, whether the UE should change the RRC state or not. Based on the indication received in MSG 4, the UE may either remain in INACTIVE state or the UE may enter CONNECTED state as shown in FIG. 5.

The UE 103*a* transmits the MSG 5 to the target network node 101*b* indicating that the UE resumes 506 RRC connection with the target network node 101*b*. The UE 103*a* establishes 507 MBS session with the AMF and receives MBS data. Further, when the MBS session is initiated, the UE releases RRC connection with the target network node 101*b* for entering the INACTIVE state and also releases 508 RRC connection and then receives the transmission of the MBS data from the target network node 101*b*.

Figure 6:
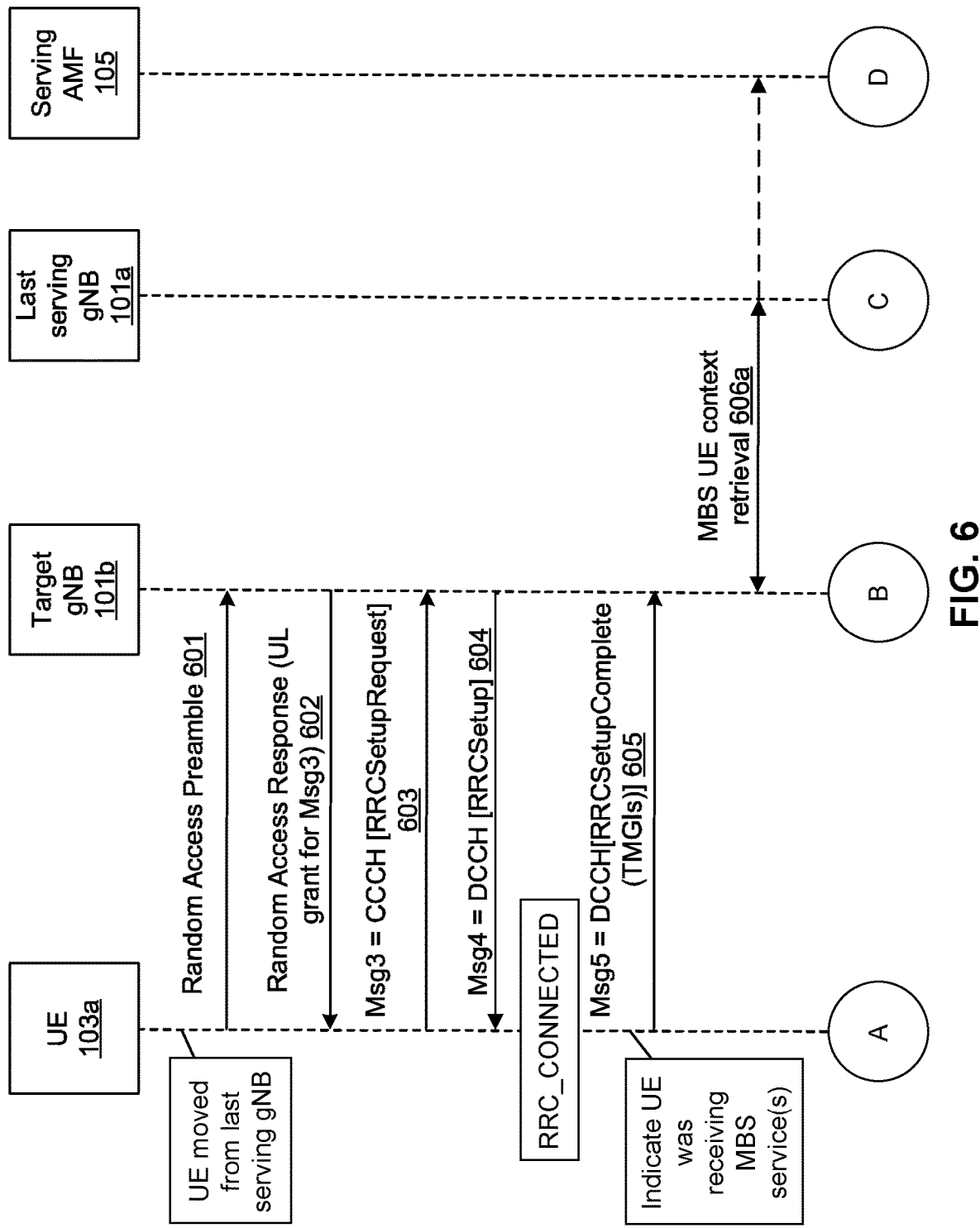
FIG. 6 is a signal flow diagram illustrating example operations in the wireless communication network, initiated by the UE during mobility in a RRC IDLE state.

FIG. 6 is a signal flow diagram illustrating example operations in the wireless communication network, initiated by the UE during mobility in a RRC IDLE state.

As depicted in FIG. 6, the UE 103*a* during mobility has moved from the source network node and handed over to the target network node 101*b*. The UE 103*a* performs a random access to the target network node 101*b* and transmits 601 a random access preamble to the target network node 101*b*. The UE 103*a* receives 602 a random access response message from the target network node 101*b*. The random access response message comprises a UL grant for transmitting MSG 3 to the target network node. With the UL grant, the UE 103*a* transmits 603 MSG 3 comprising a RRC setup request to the target network node 101*b*. The MSG 3 may be transmitted to the target network node 101*b* on a common control channel. Upon receiving the MSG 3 from the UE 103*a*, the target network node 101*b* transmits 604 MSG 4 on a downlink control channel with cause as RRC setup to the UE 103*a*. Further, upon receiving the MSG 4, the UE 103*a* enters RRC CONNECTED state and transmits 605, MSG 5 with cause as RRC setup complete along with TMGIs. With the MSG 5, the UE 103*a* indicates that it was receiving MBS data from the source network node and that the UE 103*a* is interested in receiving the same MBS from the target network node 101*b*.

The target network node may receive 606*aa*, the MBS context related to the MBS session from the last serving node 101*a*, which is a source network node, when the MBS context is available at the last serving node 101.

In case when the MBS context of the UE 103*a* related to the MBS session is unavailable at the last serving node 101*a*, then the target network node 101*b* may initiate 606*b*, a MBS session join procedure with the AMF 105, in case when the UE 103*a* is a first UE for the MBS session. For example, if the UE 103*a* is the first one interested in a session, the needs to communicate with AMF 105 for joining the session, obtaining MBS session context as well as having NGAP Path switch 606*c* before it can deliver MBS data to the UE 103*a*.

Further, the UE 103*a* receives 607 the PTM configuration from the target network node 101*b* in MSG 6 through a downlink control channel. Further, the target network node 101*b* may indicate the UE in MSG 6, whether the UE should change the RRC state or not. Based on the indication received in MSG 6, the UE may either remain in IDLE state as shown in FIG. 6.

The UE 103*a* establishes 608 MBS session with the AMF and receives MBS data. Further, when the MBS session is initiated, the UE releases 609 RRC connection with the target network node 101*b* for entering the INACTIVE state and continues receiving the transmission of the MBS data from the target network node 101*b*.

Figure 7:
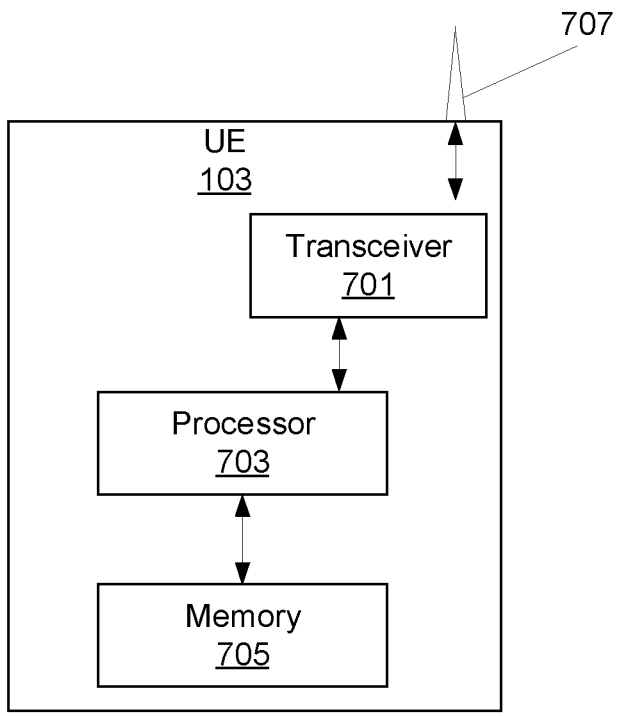
FIG. 7 is an example schematic diagram showing functional modules of the UE.

FIG. 7 is an example schematic diagram showing functional modules of the UE according to some embodiments. As shown, in FIG. 7, the UE 103 may include an antenna 707, e.g., corresponding to antenna 4111 of FIG. 10, and a transceiver circuitry 701 also referred to as a transceiver, e.g., corresponding to interface 4114 of FIG. 10, including a transmitter and a receiver configured to provide uplink and downlink radio communications with a base station(s), e.g., corresponding to network node 4160 of FIG. 10, also referred to as a radio access network. The UE 103 may also include a processing circuitry 703 also referred to as a processor, e.g., corresponding to processing circuitry 4120 of FIG. 10, coupled to the transceiver circuitry, and memory circuitry 705 also referred to as memory, e.g., corresponding to device readable medium 4130 of FIG. 10, coupled to the processing circuitry. The memory circuitry 705 may include computer readable program code that when executed by the processing circuitry 703 causes the processing circuitry to perform operations according to embodiments disclosed herein. According to other embodiments, processing circuitry 703 may be defined to include memory so that separate memory circuitry is not required.

Various operations of the UE 103 may be performed by processing circuitry 703 and/or transceiver circuitry 701. For example, the processing circuitry 703 may control transceiver circuitry 701 to transmit communications through transceiver circuitry 701 over a radio interface to a radio access network node which is a base station and/or to receive communications through transceiver circuitry 701 from the base station over a radio interface. Moreover, modules may be stored in memory circuitry 705, and these modules may provide instructions so that when instructions of a module are executed by processing circuitry 703, the processing circuitry 703 performs respective operations as defined in the steps shown in the FIG. 4.

Figure 8:
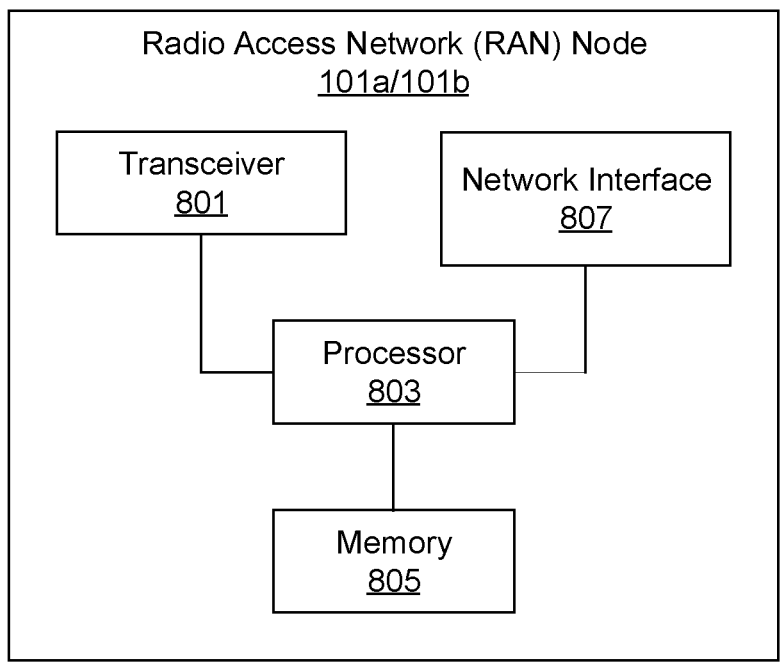
FIG. 8 is an example schematic diagram showing functional modules of a radio access network node.

FIG. 8 is an example schematic diagram showing functional modules of a radio access network node 101*a*/101*b* according to some embodiments. As shown, the network node 101*a*/101*b* may include transceiver circuitry 801 (also referred to as a transceiver, e.g., corresponding to portions of interface 4190 of FIG. 10) including a transmitter and a receiver configured to provide uplink and downlink radio communications with mobile terminals. The network node 101*a*/101*b* may include network interface circuitry 807 (also referred to as a network interface, e.g., corresponding to portions of interface 4190 of FIG. 10) configured to provide communications with other nodes, e.g., with other base stations, of a radio access network and/or core network. The network node 101*a*/101*b* may also include processing circuitry 803 (also referred to as a processor, e.g., corresponding to processing circuitry 4170) coupled to the transceiver circuitry, and memory circuitry 805 (also referred to as memory, e.g., corresponding to device readable medium 4180 of FIG. 10) coupled to the processing circuitry. The memory circuitry 805 may include computer readable program code that when executed by the processing circuitry 803 causes the processing circuitry to perform operations according to embodiments disclosed in the FIGS. 2 and 3. In some embodiments, processing circuitry 803 may be defined to include memory so that a separate memory circuitry is not required.

Various operations of the network node 101*a*/101*b* may be performed by the processing circuitry 803, the network interface 807, and/or the transceiver 801. For example, processing circuitry 803 may control transceiver 801 to transmit downlink communications through transceiver 801 over a radio interface to one or more UEs and/or to receive uplink communications through the transceiver 801 from the one or more UEs over a radio interface. Similarly, the processing circuitry 803 may control network interface 807 to transmit communications through the network interface 807 to one or more other network nodes and/or to receive communications through network interface from one or more other network nodes. Moreover, modules may be stored in memory 805, and these modules may provide instructions so that when instructions of a module are executed by processing circuitry 803, processing circuitry 803 performs respective operations, e.g., operations discussed below with respect to embodiments relating to network nodes as described in the FIGS. 2 and 3.

In some embodiments, the network node 101*a*/101*b* may be implemented as a core network, CN, node without a transceiver. In such embodiments, transmission to the UEs may be initiated by the network node 101*a*/101*b* so that transmission to the UE is provided through the network node 101*a*/101*b* including a transceiver, e.g., through a base station or RAN node.

Figure 9:
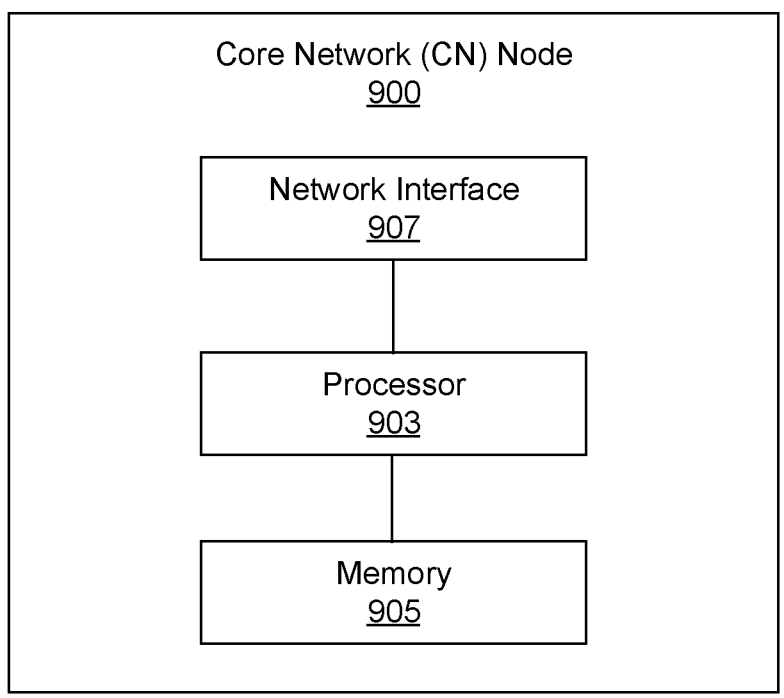
FIG. 9 is an example schematic diagram showing functional modules of a core network, CN, node.

FIG. 9 is an example schematic diagram showing functional modules of a core network, CN, node 900 according to some embodiments. The CN, node 900 may be a session management function, SMF, or an access and mobility management function, AMF. The CN node 900 may include a network interface 907 configured to provide communications with other nodes of the core network and/or the RAN. The CN node 900 may also include a processor 903 coupled to the network interface 907, and a memory 905 coupled to the processor 903. The memory 905 may include computer readable program code that when executed by the processor 903 causes the processing circuitry to perform various steps as described in the FIGS. 2 and 3.

Various operations of the CN node 900 may be performed by the processor 903 and/or network interface 907. For example, the processor 903 may control network interface 907 to transmit communications through network interface 907 to the one or more other network nodes and/or to receive communications through network interface 907 from one or more other network nodes. Moreover, modules may be stored in the memory 905, and these modules may provide instructions so that when instructions of a module are executed by the processor 903, the processor 903 performs respective operations as explained in the FIGS. 2 and 3.

Figure 10:
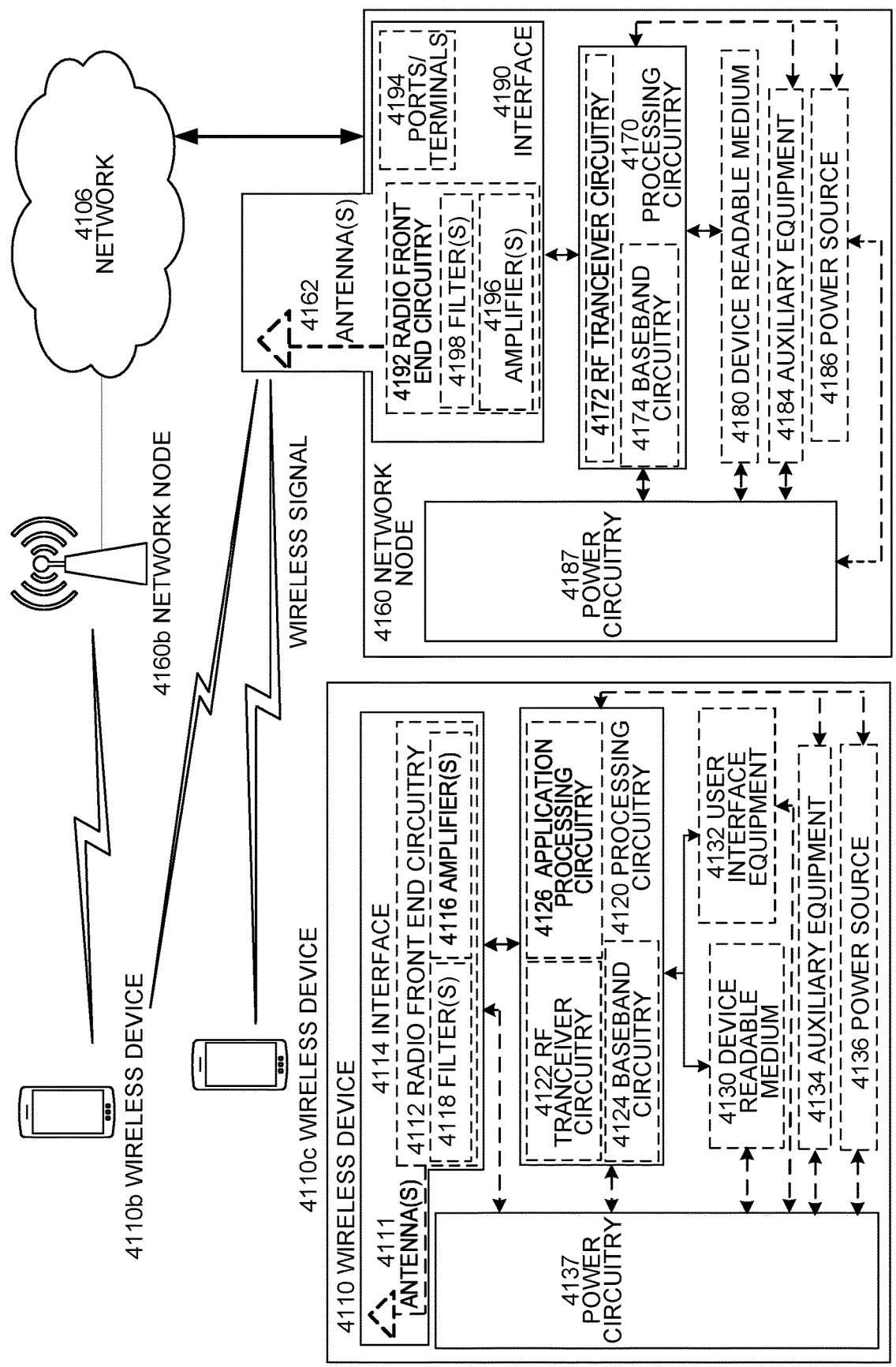
FIG. 10 is a block diagram of an example wireless network.

FIG. 10 is another block diagram of a wireless network according to some embodiments. Although the subject matter described herein may be implemented in any appropriate type of system using any suitable components, the embodiments disclosed herein are described in relation to a wireless network, such as the example wireless network illustrated in FIG. 10. For simplicity, the wireless network of FIG. 10 only depicts network 4106, network nodes 4160 and 4160*b*, and WDs 4110, 4110*b*, and 4110*c* (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node 4160 and wireless device (WD) 4110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications, GSM, Universal Mobile Telecommunications System UMTS, Long Term Evolution, LTE, and/or other suitable 2G, 3G, 4G, or 5G standards; wireless local area network, WLAN, standards, such as the IEEE 802.11 standards; and/or any other appropriate wireless communication standard, such as the Worldwide Interoperability for Microwave Access (WiMax), Bluetooth, Z-Wave and/or ZigBee standards.

Network 4106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 4160 and WD 4110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 10, network node 4160 includes processing circuitry 4170, device readable medium 4180, interface 4190, auxiliary equipment 4184, power source 4186, power circuitry 4187, and antenna 4162. Although network node 4160 illustrated in the example wireless network of FIG. 10 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 4160 are depicted as single boxes located within a larger box, or nested within multiple boxes, in practice, a network node may comprise multiple different physical components that make up a single illustrated component (e.g., device readable medium 4180 may comprise multiple separate hard drives as well as multiple RAM modules).

Similarly, network node 4160 may be composed of multiple physically separate components (e.g., a NodeB component and a RNC component, or a BTS component and a BSC component, etc.), which may each have their own respective components. In certain scenarios in which network node 4160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 4160 may be configured to support multiple radio access technologies (RATs). In such embodiments, some components may be duplicated (e.g., separate device readable medium 4180 for the different RATs) and some components may be reused (e.g., the same antenna 4162 may be shared by the RATs). Network node 4160 may also include multiple sets of the various illustrated components for different wireless technologies integrated into network node 4160, such as, for example, GSM, WCDMA, LTE, NR, WiFi, or Bluetooth wireless technologies. These wireless technologies may be integrated into the same or different chip or set of chips and other components within network node 4160.

Processing circuitry 4170 is configured to perform any determining, calculating, or similar operations (e.g., certain obtaining operations) described herein as being provided by a network node. These operations performed by processing circuitry 4170 may include processing information obtained by processing circuitry 4170 by, for example, converting the obtained information into other information, comparing the obtained information or converted information to information stored in the network node, and/or performing one or more operations based on the obtained information or converted information, and as a result of said processing making a determination.

Processing circuitry 4170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 4160 components, such as device readable medium 4180, network node 4160 functionality. For example, processing circuitry 4170 may execute instructions stored in device readable medium 4180 or in memory within processing circuitry 4170. Such functionality may include providing any of the various wireless features, functions, or benefits discussed herein. In some embodiments, processing circuitry 4170 may include a system on a chip (SOC).

In some embodiments, processing circuitry 4170 may include one or more of radio frequency (RF) transceiver circuitry 4172 and baseband processing circuitry 4174. In some embodiments, radio frequency (RF) transceiver circuitry 4172 and baseband processing circuitry 4174 may be on separate chips (or sets of chips), boards, or units, such as radio units and digital units. In alternative embodiments, part or all of RF transceiver circuitry 4172 and baseband processing circuitry 4174 may be on the same chip or set of chips, boards, or units In certain embodiments, some or all of the functionality described herein as being provided by a network node, base station, eNB or other such network device may be performed by processing circuitry 4170 executing instructions stored on device readable medium 4180 or memory within processing circuitry 4170. In alternative embodiments, some or all of the functionality may be provided by processing circuitry 4170 without executing instructions stored on a separate or discrete device readable medium, such as in a hard-wired manner. In any of those embodiments, whether executing instructions stored on a device readable storage medium or not, processing circuitry 4170 can be configured to perform the described functionality. The benefits provided by such functionality are not limited to processing circuitry 4170 alone or to other components of network node 4160, but are enjoyed by network node 4160 as a whole, and/or by end users and the wireless network generally.

Device readable medium 4180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 4170. Device readable medium 4180 may store any suitable instructions, data or information, including a computer program, software, an application including one or more of logic, rules, code, tables, etc. and/or other instructions capable of being executed by processing circuitry 4170 and, utilized by network node 4160. Device readable medium 4180 may be used to store any calculations made by processing circuitry 4170 and/or any data received via interface 4190. In some embodiments, processing circuitry 4170 and device readable medium 4180 may be considered to be integrated.

Interface 4190 is used in the wired or wireless communication of signalling and/or data between network node 4160, network 4106, and/or WDs 4110. As illustrated, interface 4190 comprises port(s)/terminal(s) 4194 to send and receive data, for example to and from network 4106 over a wired connection. Interface 4190 also includes radio front end circuitry 4192 that may be coupled to, or in certain embodiments a part of, antenna 4162. Radio front end circuitry 4192 comprises filters 4198 and amplifiers 4196. Radio front end circuitry 4192 may be connected to antenna 4162 and processing circuitry 4170. Radio front end circuitry may be configured to condition signals communicated between antenna 4162 and processing circuitry 4170. Radio front end circuitry 4192 may receive digital data that is to be sent out to other network nodes or WDs via a wireless connection. Radio front end circuitry 4192 may convert the digital data into a radio signal having the appropriate channel and bandwidth parameters using a combination of filters 4198 and/or amplifiers 4196. The radio signal may then be transmitted via antenna 4162. Similarly, when receiving data, antenna 4162 may collect radio signals which are then converted into digital data by radio front end circuitry 4192. The digital data may be passed to processing circuitry 4170. In other embodiments, the interface may comprise different components and/or different combinations of components.

In certain alternative embodiments, network node 4160 may not include separate radio front end circuitry 4192, instead, processing circuitry 4170 may comprise radio front end circuitry and may be connected to antenna 4162 without separate radio front end circuitry 4192. Similarly, in some embodiments, all or some of RF transceiver circuitry 4172 may be considered a part of interface 4190. In still other embodiments, interface 4190 may include one or more ports or terminals 4194, radio front end circuitry 4192, and RF transceiver circuitry 4172, as part of a radio unit (not shown), and interface 4190 may communicate with baseband processing circuitry 4174, which is part of a digital unit (not shown).

Antenna 4162 may include one or more antennas, or antenna arrays, configured to send and/or receive wireless signals. Antenna 4162 may be coupled to radio front end circuitry 4192 and may be any type of antenna capable of transmitting and receiving data and/or signals wirelessly. In some embodiments, antenna 4162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 4162 may be separate from network node 4160 and may be connectable to network node 4160 through an interface or port.

Antenna 4162, interface 4190, and/or processing circuitry 4170 may be configured to perform any receiving operations and/or certain obtaining operations described herein as being performed by a network node. Any information, data and/or signals may be received from a wireless device, another network node and/or any other network equipment. Similarly, antenna 4162, interface 4190, and/or processing circuitry 4170 may be configured to perform any transmitting operations described herein as being performed by a network node. Any information, data and/or signals may be transmitted to a wireless device, another network node and/or any other network equipment.

Power circuitry 4187 may comprise, or be coupled to, power management circuitry and is configured to supply the components of network node 4160 with power for performing the functionality described herein. Power circuitry 4187 may receive power from power source 4186. Power source 4186 and/or power circuitry 4187 may be configured to provide power to the various components of network node 4160 in a form suitable for the respective components (e.g., at a voltage and current level needed for each respective component). Power source 4186 may either be included in, or external to, power circuitry 4187 and/or network node 4160. For example, network node 4160 may be connectable to an external power source (e.g., an electricity outlet) via an input circuitry or interface such as an electrical cable, whereby the external power source supplies power to power circuitry 4187. As a further example, power source 4186 may comprise a source of power in the form of a battery or battery pack which is connected to, or integrated in, power circuitry 4187. The battery may provide backup power should the external power source fail. Other types of power sources, such as photovoltaic devices, may also be used.

Alternative embodiments of network node 4160 may include additional components beyond those shown in FIG. 10 that may be responsible for providing certain aspects of the network node's functionality, including any of the functionality described herein and/or any functionality necessary to support the subject matter described herein. For example, network node 4160 may include user interface equipment to allow input of information into network node 4160 and to allow output of information from network node 4160. This may allow a user to perform diagnostic, maintenance, repair, and other administrative functions for network node 4160.

As used herein, wireless device, WD, refers to a UE or a device capable, configured, arranged and/or operable to communicate wirelessly with network nodes and/or other wireless devices. Unless otherwise noted, the term WD may be used interchangeably herein with the UE. Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP, VoIP, phone, a wireless local loop phone, a desktop computer, a personal digital assistant, PDA, a wireless cameras, a gaming console or device, a music storage device, a playback appliance, a wearable terminal device, a wireless endpoint, a mobile station, a tablet, a laptop, a laptop-embedded equipment, LEE, a laptop-mounted equipment, LME, a smart device, a wireless customer-premise equipment, CPE, a vehicle-mounted wireless terminal device, or the like. A WD may support device-to-device, D2D, communication, for example by implementing a 3GPP standard for sidelink communication, vehicle-to-vehicle, V2V, vehicle-to-infrastructure V2I, vehicle-to-everything, V2X and may in this case be referred to as a D2D communication device.

As yet another specific example, in an Internet of Things, IoT scenario, a WD may represent a machine or other device that performs monitoring and/or measurements, and transmits the results of such monitoring and/or measurements to another WD and/or a network node. The WD may in this case be a machine-to-machine, M2M, device, which may in a 3GPP context be referred to as an MTC device. As one particular example, the WD may be a UE implementing the 3GPP narrow band internet of things, NB-IoT standard. Particular examples of such machines or devices are sensors, metering devices such as power meters, industrial machinery, or home or personal appliances, e.g. refrigerators, televisions personal wearables, e.g., watches, fitness trackers, etc. In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 4110 includes antenna 4111, interface 4114, processing circuitry 4120, device readable medium 4130, user interface equipment 4132, auxiliary equipment 4134, power source 4136 and power circuitry 4137. WD 4110 may include multiple sets of one or more of the illustrated components for different wireless technologies supported by WD 4110, such as, for example, GSM, WCDMA, LTE, NR, WiFi, WiMAX, or Bluetooth wireless technologies, just to mention a few. These wireless technologies may be integrated into the same or different chips or set of chips as other components within WD 4110.

Antenna 4111 may include one or more antennas or antenna arrays, configured to send and/or receive wireless signals, and is connected to interface 4114. In certain alternative embodiments, antenna 4111 may be separate from WD 4110 and be connectable to WD 4110 through an interface or port. Antenna 4111, interface 4114, and/or processing circuitry 4120 may be configured to perform any receiving or transmitting operations described herein as being performed by a WD. Any information, data and/or signals may be received from a network node and/or another WD. In some embodiments, radio front end circuitry and/or antenna 4111 may be considered an interface.

As illustrated, interface 4114 comprises radio front end circuitry 4112 and antenna 4111. Radio front end circuitry 4112 comprise one or more filters 4118 and amplifiers 4116. Radio front end circuitry 4112 is connected to antenna 4111 and processing circuitry 4120, and is configured to condition signals communicated between antenna 4111 and processing circuitry 4120. Radio front end circuitry 4112 may be coupled to or a part of antenna 4111. In some embodiments, WD 4110 may not include separate radio front end circuitry 4112; rather, processing circuitry 4120 may comprise radio front end circuitry and may be connected to antenna 4111. Similarly, in some embodiments, some or all of RF transceiver circuitry 4122 may be considered a part of interface 4114. Radio front end circuitry 4112 may receive digital data that is to be sent out to other network nodes or WDs via a wireless connection. Radio front end circuitry 4112 may convert the digital data into a radio signal having the appropriate channel and bandwidth parameters using a combination of filters 4118 and/or amplifiers 4116. The radio signal may then be transmitted via antenna 4111. Similarly, when receiving data, antenna 4111 may collect radio signals which are then converted into digital data by radio front end circuitry 4112. The digital data may be passed to processing circuitry 4120. In other embodiments, the interface may comprise different components and/or different combinations of components.

Processing circuitry 4120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 4110 components, such as device readable medium 4130, WD 4110 functionality. Such functionality may include providing any of the various wireless features or benefits discussed herein. For example, processing circuitry 4120 may execute instructions stored in device readable medium 4130 or in memory within processing circuitry 4120 to provide the functionality disclosed herein.

As illustrated, processing circuitry 4120 includes one or more of RF transceiver circuitry 4122, baseband processing circuitry 4124, and application processing circuitry 4126. In other embodiments, the processing circuitry may comprise different components and/or different combinations of components. In certain embodiments processing circuitry 4120 of WD 4110 may comprise a SOC. In some embodiments, RF transceiver circuitry 4122, baseband processing circuitry 4124, and application processing circuitry 4126 may be on separate chips or sets of chips. In alternative embodiments, part or all of baseband processing circuitry 4124 and application processing circuitry 4126 may be combined into one chip or set of chips, and RF transceiver circuitry 4122 may be on a separate chip or set of chips. In still alternative embodiments, part or all of RF transceiver circuitry 4122 and baseband processing circuitry 4124 may be on the same chip or set of chips, and application processing circuitry 4126 may be on a separate chip or set of chips. In yet other alternative embodiments, part or all of RF transceiver circuitry 4122, baseband processing circuitry 4124, and application processing circuitry 4126 may be combined in the same chip or set of chips. In some embodiments, RF transceiver circuitry 4122 may be a part of interface 4114. RF transceiver circuitry 4122 may condition RF signals for processing circuitry 4120.

In certain embodiments, some or all of the functionality described herein as being performed by a WD may be provided by processing circuitry 4120 executing instructions stored on device readable medium 4130, which in certain embodiments may be a computer-readable storage medium. In alternative embodiments, some or all of the functionality may be provided by processing circuitry 4120 without executing instructions stored on a separate or discrete device readable storage medium, such as in a hard-wired manner. In any of those particular embodiments, whether executing instructions stored on a device readable storage medium or not, processing circuitry 4120 can be configured to perform the described functionality. The benefits provided by such functionality are not limited to processing circuitry 4120 alone or to other components of WD 4110, but are enjoyed by WD 4110 as a whole, and/or by end users and the wireless network generally.

Processing circuitry 4120 may be configured to perform any determining, calculating, or similar operations (e.g., certain obtaining operations) described herein as being performed by a WD. These operations, as performed by processing circuitry 4120, may include processing information obtained by processing circuitry 4120 by, for example, converting the obtained information into other information, comparing the obtained information or converted information to information stored by WD 4110, and/or performing one or more operations based on the obtained information or converted information, and as a result of said processing making a determination.

Device readable medium 4130 may be operable to store a computer program, software, an application including one or more of logic, rules, code, tables, etc. and/or other instructions capable of being executed by processing circuitry 4120. Device readable medium 4130 may include computer memory e.g., Random Access Memory, RAM, or Read Only Memory ROM, mass storage media e.g., a hard disk, removable storage media, and/or any other volatile or non-volatile, non-transitory device readable and/or computer executable memory devices that store information, data, and/or instructions that may be used by processing circuitry 4120. In some embodiments, processing circuitry 4120 and device readable medium 4130 may be considered to be integrated.

User interface equipment 4132 may provide components that allow for a human user to interact with WD 4110. Such interaction may be of many forms, such as visual, audial, tactile, etc. User interface equipment 4132 may be operable to produce output to the user and to allow the user to provide input to WD 4110. The type of interaction may vary depending on the type of user interface equipment 4132 installed in WD 4110. For example, if WD 4110 is a smart phone, the interaction may be via a touch screen; if WD 4110 is a smart meter, the interaction may be through a screen that provides usage (e.g., the number of gallons used) or a speaker that provides an audible alert (e.g., if smoke is detected). User interface equipment 4132 may include input interfaces, devices and circuits, and output interfaces, devices and circuits. User interface equipment 4132 is configured to allow input of information into WD 4110, and is connected to processing circuitry 4120 to allow processing circuitry 4120 to process the input information. User interface equipment 4132 may include, for example, a microphone, a proximity or other sensor, keys/buttons, a touch display, one or more cameras, a USB port, or other input circuitry. User interface equipment 4132 is also configured to allow output of information from WD 4110, and to allow processing circuitry 4120 to output information from WD 4110. User interface equipment 4132 may include, for example, a speaker, a display, vibrating circuitry, a USB port, a headphone interface, or other output circuitry. Using one or more input and output interfaces, devices, and circuits, of user interface equipment 4132, WD 4110 may communicate with end users and/or the wireless network, and allow them to benefit from the functionality described herein.

Auxiliary equipment 4134 is operable to provide more specific functionality which may not be generally performed by WDs. This may comprise specialized sensors for doing measurements for various purposes, interfaces for additional types of communication such as wired communications etc. The inclusion and type of components of auxiliary equipment 4134 may vary depending on the embodiment and/or scenario.

Power source 4136 may, in some embodiments, be in the form of a battery or battery pack. Other types of power sources, such as an external power source e.g., an electricity outlet, photovoltaic devices or power cells, may also be used. WD 4110 may further comprise power circuitry 4137 for delivering power from power source 4136 to the various parts of WD 4110 which need power from power source 4136 to carry out any functionality described or indicated herein. Power circuitry 4137 may in certain embodiments comprise power management circuitry. Power circuitry 4137 may additionally or alternatively be operable to receive power from an external power source; in which case WD 4110 may be connectable to the external power source (such as an electricity outlet) via input circuitry or an interface such as an electrical power cable. Power circuitry 4137 may also in certain embodiments be operable to deliver power from an external power source to power source 4136. This may be, for example, for the charging of power source 4136. Power circuitry 4137 may perform any formatting, converting, or other modification to the power from power source 4136 to make the power suitable for the respective components of WD 4110 to which power is supplied.

Figure 11:
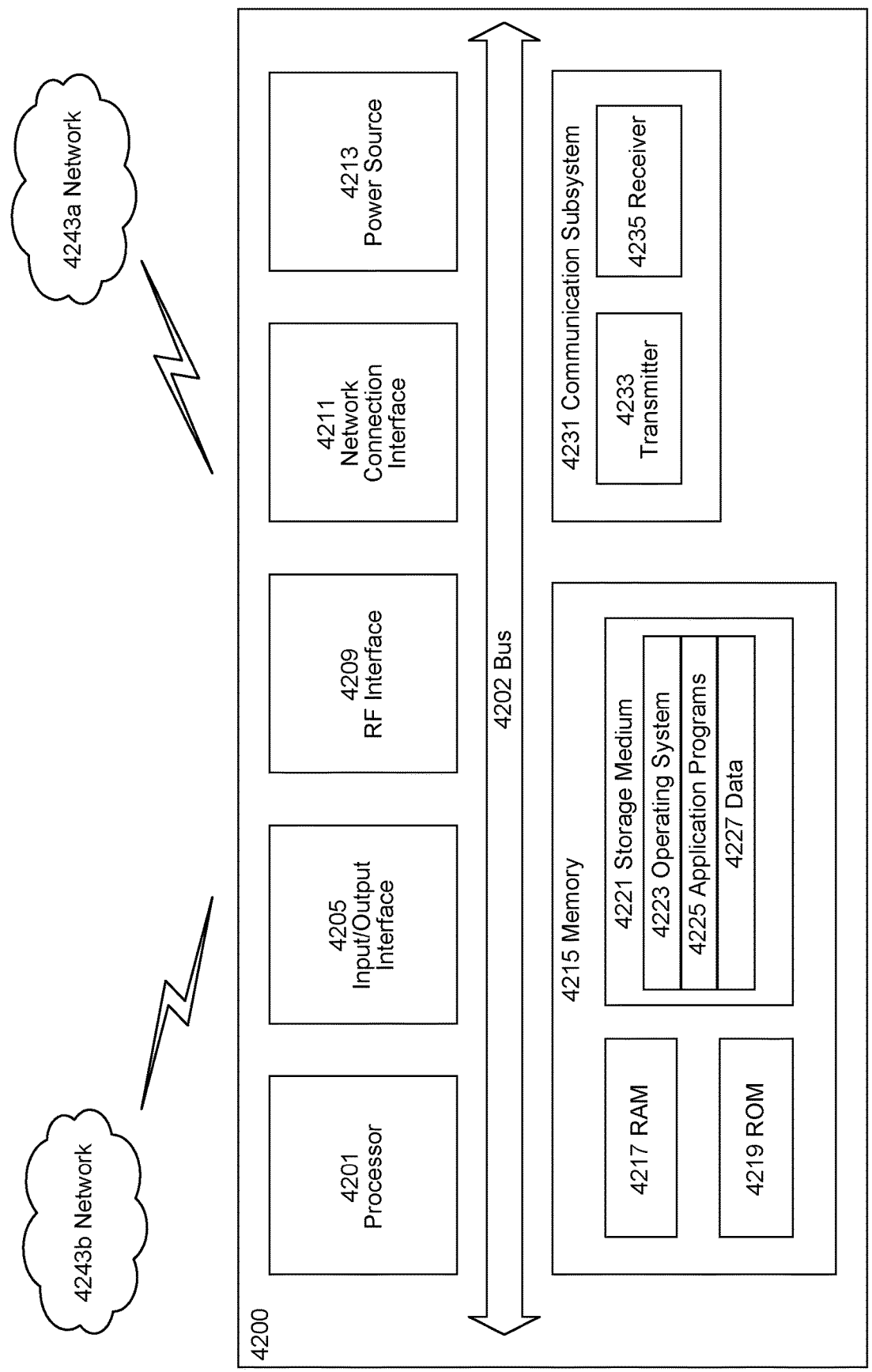
FIG. 11 is a block diagram of an example UE.

FIG. 11 is another block diagram of an example user equipment according to some embodiments. As used herein, the UE may not necessarily have a user in the sense of a human user who owns and/or operates the relevant device. Instead, a UE may represent a device that is intended for sale to, or operation by, a human user but which may not, or which may not initially, be associated with a specific human user, e.g., a smart sprinkler controller. Alternatively, a UE may represent a device that is not intended for sale to, or operation by, an end user but which may be associated with or operated for the benefit of a user e.g., a smart power meter. A UE 4200 may be any UE identified by the 3GPP, including a NB-IoT UE, a machine type communication, MTC, UE, and/or an enhanced MTC, eMTC, UE. The UE 4200, as illustrated in FIG. 11, is one example of a WD configured for communication in accordance with one or more communication standards promulgated by the 3GPP, such as 3GPP's GSM, UMTS, LTE, and/or 5G standards. As mentioned previously, the term WD and UE may be used interchangeable. Accordingly, although FIG. 10 is a UE, the components discussed herein are equally applicable to a WD, and vice-versa.

In FIG. 10, the UE 4200 includes processing circuitry 4201 that is operatively coupled to input/output interface 4205, a radio frequency, RF, interface 4209, network connection interface 4211, a memory 4215 including random access memory, RAM 4217, read-only memory, ROM 4219, and a storage medium 4221 or the like, communication subsystem 4231, power source 4213, and/or any other component, or any combination thereof. A storage medium 4221 includes operating system 4223, application program 4225, and data 4227. In other embodiments, storage medium 4221 may include other similar types of information. Certain UEs may utilize all of the components shown in FIG. 11, or only a subset of the components. The level of integration between the components may vary from one UE to another UE. Further, certain UEs may contain multiple instances of a component, such as multiple processors, memories, transceivers, transmitters, receivers, etc.

In FIG. 11, processing circuitry 4201 may be configured to process computer instructions and data. Processing circuitry 4201 may be configured to implement any sequential state machine operative to execute machine instructions stored as machine-readable computer programs in the memory, such as one or more hardware-implemented state machines, e.g., in discrete logic, FPGA, ASIC, etc.; programmable logic together with appropriate firmware; one or more stored program, general-purpose processors, such as a microprocessor or Digital Signal Processor, DSP, together with appropriate software; or any combination of the above. For example, the processing circuitry 4201 may include two central processing units, CPUs. Data may be information in a form suitable for use by a computer.

In the depicted embodiment, input/output interface 4205 may be configured to provide a communication interface to an input device, output device, or input and output device. The UE 4200 may be configured to use an output device via input/output interface 4205. An output device may use the same type of interface port as an input device. For example, a USB port may be used to provide input to and output from UE 4200. The output device may be a speaker, a sound card, a video card, a display, a monitor, a printer, an actuator, an emitter, a smartcard, another output device, or any combination thereof. UE 4200 may be configured to use an input device via input/output interface 4205 to allow a user to capture information into UE 4200. The input device may include a touch-sensitive or presence-sensitive display, a camera, a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 11, RF interface 4209 may be configured to provide a communication interface to RF components such as a transmitter, a receiver, and an antenna. Network connection interface 4211 may be configured to provide a communication interface to network 4243*a*. Network 4243*a* may encompass wired and/or wireless networks such as a local-area network, LAN, a wide-area network, WAN, a computer network, a wireless network, a telecommunications network, another like network or any combination thereof. For example, network 4243*a* may comprise a Wi-Fi network. Network connection interface 4211 may be configured to include a receiver and a transmitter interface used to communicate with one or more other devices over a communication network according to one or more communication protocols, such as Ethernet, TCP/IP, SONET, ATM, or the like. Network connection interface 4211 may implement receiver and transmitter functionality appropriate to the communication network links (e.g., optical, electrical, and the like). The transmitter and receiver functions may share circuit components, software or firmware, or alternatively may be implemented separately.

RAM 4217 may be configured to interface via bus 4202 to processing circuitry 4201 to provide storage or caching of data or computer instructions during the execution of software programs such as the operating system, application programs, and device drivers. ROM 4219 may be configured to provide computer instructions or data to processing circuitry 4201. For example, ROM 4219 may be configured to store invariant low-level system code or data for basic system functions such as basic input and output (I/O), startup, or reception of keystrokes from a keyboard that are stored in a non-volatile memory. Storage medium 4221 may be configured to include memory such as RAM, ROM, programmable read-only memory, PROM, erasable programmable read-only memory EPROM, electrically erasable programmable read-only memory EEPROM, magnetic disks, optical disks, floppy disks, hard disks, removable cartridges, or flash drives. In one example, storage medium 4221 may be configured to include operating system 4223, application program 4225 such as a web browser application, a widget or gadget engine or another application, and data file 4227. Storage medium 4221 may store, for use by UE 4200, any of a variety of various operating systems or combinations of operating systems.

Storage medium 4221 may be configured to include a number of physical drive units, such as redundant array of independent disks, RAID, floppy disk drive, flash memory, USB flash drive, external hard disk drive, thumb drive, pen drive, key drive, high-density digital versatile disc, HD-DVD optical disc drive, internal hard disk drive, Blu-Ray optical disc drive, holographic digital data storage, HDDS optical disc drive, external mini-dual in-line memory module, DIMM, synchronous dynamic random access memory, SDRAM, external micro-DIMM SDRAM, smartcard memory such as a subscriber identity module or a removable user identity, SIM/RUIM module, other memory, or any combination thereof. Storage medium 4221 may allow UE 4200 to access computer-executable instructions, application programs or the like, stored on transitory or non-transitory memory media, to off-load data, or to upload data. An article of manufacture, such as one utilizing a communication system may be tangibly embodied in storage medium 4221, which may comprise a device readable medium.

In FIG. 11, processing circuitry 4201 may be configured to communicate with network 4243b using communication subsystem 4231. Network 4243a and network 4243b may be the same network or networks or different network or networks. Communication subsystem 4231 may be configured to include one or more transceivers used to communicate with network 4243b. For example, communication subsystem 4231 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 4233 and/or receiver 4235 to implement transmitter or receiver functionality, respectively, appropriate to the RAN links. Further, transmitter 4233 and receiver 4235 of each transceiver may share circuit components, software or firmware, or alternatively may be implemented separately.

The communication functions of communication subsystem 4231 may include data communication, voice communication, multimedia communication, short-range communications such as Bluetooth, near-field communication, location-based communication such as the use of the global positioning system, GPS to determine a location, another like communication function, or any combination thereof. For example, communication subsystem 4231 may include cellular communication, Wi-Fi communication, Bluetooth communication, and GPS communication. Network 4243b may encompass wired and/or wireless networks such as a local-area network LAN, a wide-area network, WAN, a computer network, a wireless network, a telecommunications network, another like network or any combination thereof. For example, network 4243b may be a cellular network, a Wi-Fi network, and/or a near-field network. Power source 4213 may be configured to provide alternating current, AC, or direct current, DC power to components of UE 4200.

The features, benefits and/or functions described herein may be implemented in one of the components of UE 4200 or partitioned across multiple components of UE 4200. Further, the features, benefits, and/or functions described herein may be implemented in any combination of hardware, software or firmware. In one example, communication subsystem 4231 may be configured to include any of the components described herein. Further, processing circuitry 4201 may be configured to communicate with any of such components over bus 4202. In another example, any of such components may be represented by program instructions stored in memory that when executed by processing circuitry 4201 perform the corresponding functions described herein. In another example, the functionality of any of such components may be partitioned between processing circuitry 4201 and communication subsystem 4231. In another example, the non-computationally intensive functions of any of such components may be implemented in software or firmware and the computationally intensive functions may be implemented in hardware.

Figure 12:
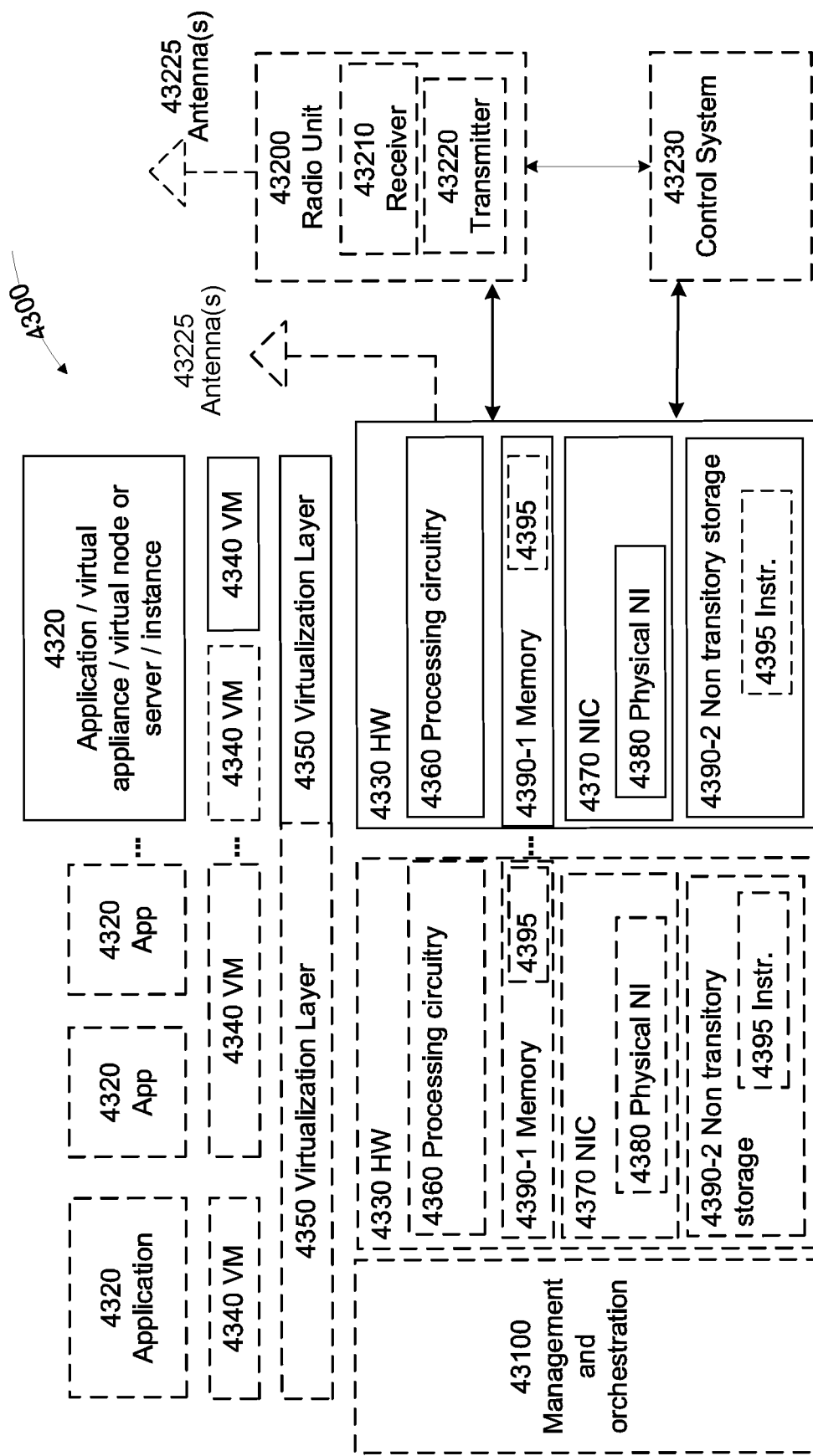
FIG. 12 is a block diagram of a virtualization environment.

FIG. 12 is a block diagram of a virtualization environment 4300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node, e.g., a virtualized base station or a virtualized radio access node, or to a device, e.g., a UE, a wireless device or any other type of communication device or components thereof and relates to an implementation in which at least a portion of the functionality is implemented as one or more virtual components, e.g., via one or more applications, components, functions, virtual machines or containers executing on one or more physical processing nodes in one or more networks.

Some or all of the functions described herein may be implemented as virtual components executed by one or more virtual machines implemented in one or more virtual environments 4300 hosted by one or more of hardware nodes 4330. Further, in embodiments in which the virtual node is not a radio access node or does not require radio connectivity, then the network node may be entirely virtualized.

The functions may be implemented by one or more applications 4320 which may alternatively be called software instances, virtual appliances, network functions, virtual nodes, virtual network functions, etc., operative to implement some of the features, functions, and/or benefits of some of the embodiments disclosed herein. Applications 4320 are run in virtualization environment 4300 which provides hardware 4330 comprising processing circuitry 4360 and memory 4390. Memory 4390 contains instructions 4395 executable by processing circuitry 4360 whereby application 4320 is operative to provide one or more of the features, benefits, and/or functions disclosed herein.

Virtualization environment 4300, comprises general-purpose or special-purpose network hardware devices 4330 comprising a set of one or more processors or processing circuitry 4360, which may be commercial off-the-shelf, COTS, processors, dedicated Application Specific Integrated Circuits, ASICs, or any other type of processing circuitry including digital or analog hardware components or special purpose processors. Each hardware device may comprise memory 4390-1 which may be non-persistent memory for temporarily storing instructions 4395 or software executed by processing circuitry 4360. Each hardware device may comprise one or more network interface controllers, NICs 4370, also known as network interface cards, which include physical network interface 4380. Each hardware device may also include non-transitory, persistent, machine-readable storage media 4390-2 having stored therein software 4395 and/or instructions executable by processing circuitry 4360. Software 4395 may include any type of software including software for instantiating one or more virtualization layers 4350, software to execute virtual machines 4340 as well as software allowing it to execute functions, features and/or benefits described in relation with some embodiments described herein.

Virtual machines 4340 comprise virtual processing, virtual memory, virtual networking or interface and virtual storage, and may be run by a corresponding virtualization layer 4350 or hypervisor. Different embodiments of the instance of virtual appliance 4320 may be implemented on one or more of virtual machines 4340, and the implementations may be made in different ways.

During operation, processing circuitry 4360 executes software 4395 to instantiate the hypervisor or virtualization layer 4350, which may sometimes be referred to as a virtual machine monitor, VMM. Virtualization layer 4350 may present a virtual operating platform that appears like networking hardware to virtual machine 4340.

As shown in FIG. 12, hardware 4330 may be a standalone network node with generic or specific components. Hardware 4330 may comprise antenna 43225 and may implement some functions via virtualization. Alternatively, hardware 4330 may be part of a larger cluster of hardware, e.g., such as in a data center or customer premise equipment where many hardware nodes work together and are managed via management and orchestration, MANO 43100, which, among others, oversees lifecycle management of applications 4320.

Virtualization of the hardware is in some contexts referred to as network function virtualization, NFV. The NFV may be used to consolidate many network equipment types onto industry standard high volume server hardware, physical switches, and physical storage, which can be located in data centers, and customer premise equipment.

In the context of NFV, virtual machine 4340 may be a software implementation of a physical machine that runs programs as if they were executing on a physical, non-virtualized machine. Each of virtual machines 4340, and that part of hardware 4330 that executes that virtual machine, be it hardware dedicated to that virtual machine and/or hardware shared by that virtual machine with others of the virtual machines 4340, forms a separate virtual network elements, VNE.

Still in the context of NFV, virtual network function, VNF is responsible for handling specific network functions that run in one or more virtual machines 4340 on top of hardware networking infrastructure 4330 and corresponds to application 4320 in FIG. 12.

One or more radio units 43200 that each include one or more transmitters 43220 and one or more receivers 43210 may be coupled to one or more antennas 43225. Radio units 43200 may communicate directly with hardware nodes 4330 via one or more appropriate network interfaces and may be used in combination with the virtual components to provide a virtual node with radio capabilities, such as a radio access node or a base station.

Some signalling can be effected with the use of control system 43230 which may alternatively be used for communication between the hardware nodes 4330 and radio units 43200.

Figure 13:
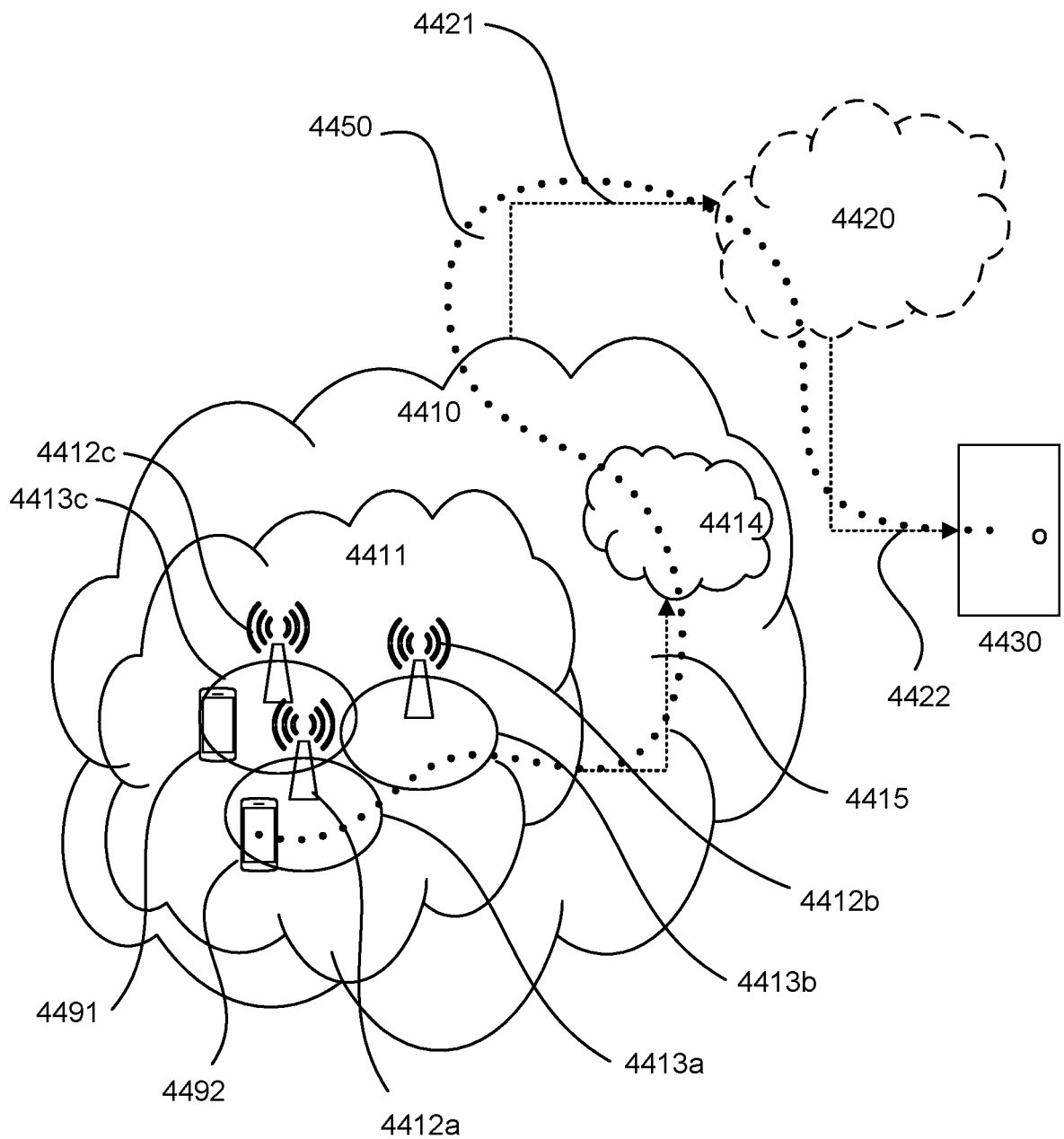
FIG. 13 is a block diagram of a telecommunication network connected via an intermediate network to a host computer.

FIG. 13 is a block diagram of a telecommunication network connected via an intermediate network to a host computer according to some embodiments. With reference to FIG. 13, in accordance with an embodiment, a communication system includes telecommunication network 4410, such as a 3GPP-type cellular network, which comprises access network 4411, such as a radio access network, and core network 4414. Access network 4411 comprises a plurality of base stations 4412a, 4412b, 4412c, such as NBs, eNBs, gNBs or other types of wireless access points, each defining a corresponding coverage area 4413a, 4413b, 4413c. Each base station 4412a, 4412b, 4412c is connectable to core network 4414 over a wired or wireless connection 4415. A first UE 4491 located in coverage area 4413c is configured to wirelessly connect to, or be paged by, the corresponding base station 4412c. A second UE 4492 in coverage area 4413a is wirelessly connectable to the corresponding base station 4412a. While a plurality of UEs 4491, 4492 are illustrated in this example, the disclosed embodiments are equally applicable to a situation where a sole UE is in the coverage area or where a sole UE is connecting to the corresponding base station 4412.

Telecommunication network 4410 is itself connected to host computer 4430, which may be embodied in the hardware and/or software of a standalone server, a cloud-implemented server, a distributed server or as processing resources in a server farm. Host computer 4430 may be under the ownership or control of a service provider, or may be operated by the service provider or on behalf of the service provider. Connections 4421 and 4422 between telecommunication network 4410 and host computer 4430 may extend directly from core network 4414 to host computer 4430 or may go via an optional intermediate network 4420. Intermediate network 4420 may be one of, or a combination of more than one of, a public, private or hosted network; intermediate network 4420, if any, may be a backbone network or the Internet; in particular, intermediate network 4420 may comprise two or more sub-networks (not shown).

The communication system of FIG. 13 as a whole enables connectivity between the connected UEs 4491, 4492 and host computer 4430. The connectivity may be described as an over-the-top, OTT connection 4450. Host computer 4430 and the connected UEs 4491, 4492 are configured to communicate data and/or signaling via OTT connection 4450, using access network 4411, core network 4414, any intermediate network 4420 and possible further infrastructure (not shown) as intermediaries. OTT connection 4450 may be transparent in the sense that the participating communication devices through which OTT connection 4450 passes are unaware of routing of uplink and downlink communications. For example, base station 4412 may not or need not be informed about the past routing of an incoming downlink communication with data originating from host computer 4430 to be forwarded (e.g., handed over) to a connected UE 4491. Similarly, base station 4412 need not be aware of the future routing of an outgoing uplink communication originating from the UE 4491 towards the host computer 4430.

Figure 14:
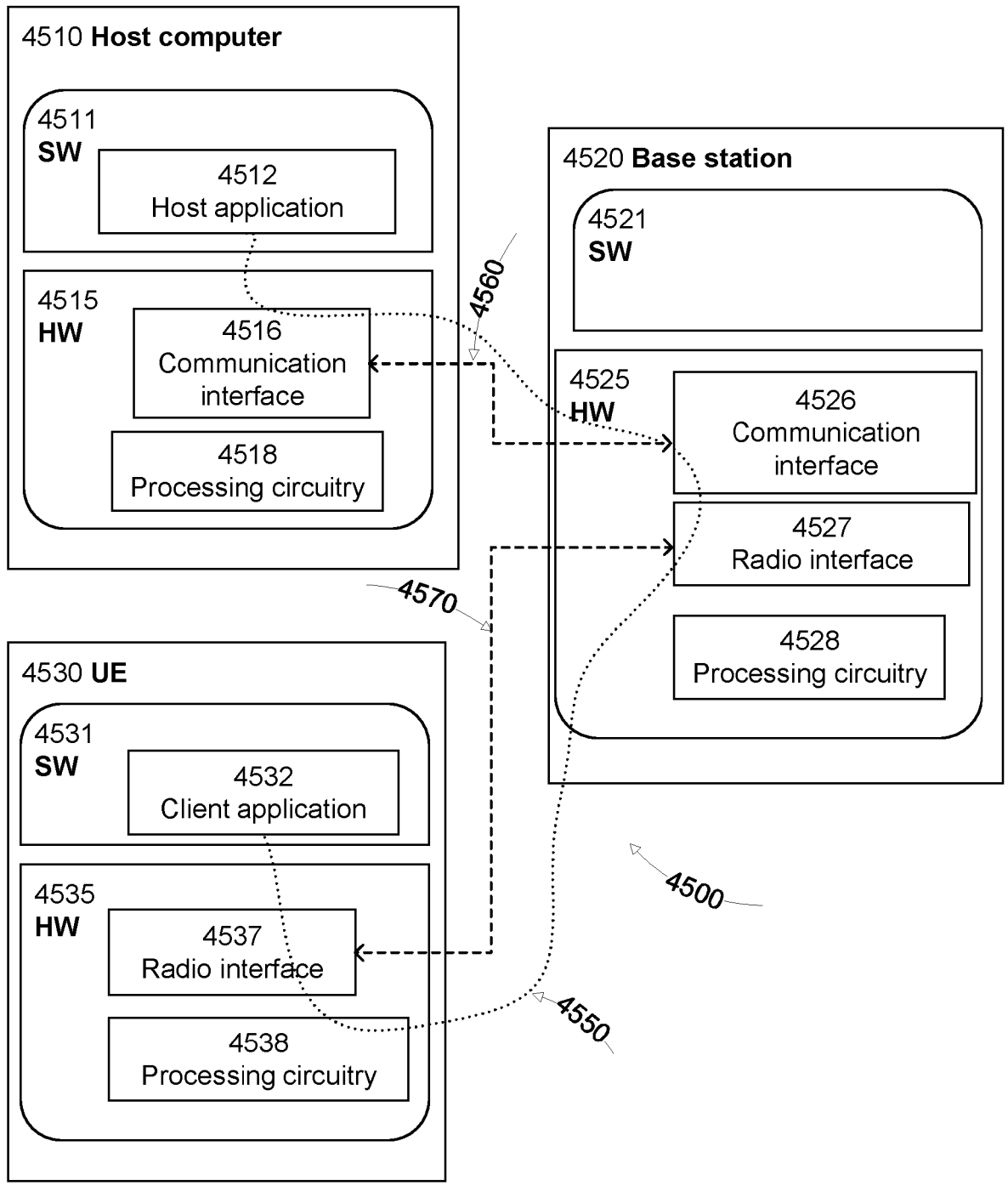
FIG. 14 is a block diagram of a host computer communicating via a base station with a UE over a partially wireless connection.

FIG. 14 is a block diagram of a host computer communicating via a base station with a user equipment over a partially wireless connection. Example implementations, in accordance with an embodiment, of the UE, base station and host computer discussed in the preceding paragraphs will now be described with reference to FIG. 14. In communication system 4500, host computer 4510 comprises hardware 4515 including communication interface 4516 configured to set up and maintain a wired or wireless connection with an interface of a different communication device of communication system 4500. Host computer 4510 further comprises processing circuitry 4518, which may have storage and/or processing capabilities.

In particular, processing circuitry 4518 may comprise one or more programmable processors, application-specific integrated circuits, field programmable gate arrays or combinations of these (not shown) adapted to execute instructions.

Host computer 4510 further comprises software 4511, which is stored in or accessible by host computer 4510 and executable by processing circuitry 4518. Software 4511 includes host application 4512. Host application 4512 may be operable to provide a service to a remote user, such as UE 4530 connecting via OTT connection 4550 terminating at UE 4530 and host computer 4510. In providing the service to the remote user, host application 4512 may provide user data which is transmitted using OTT connection 4550.

Communication system 4500 further includes base station 4520 provided in a telecommunication system and comprising hardware 4525 enabling it to communicate with host computer 4510 and with UE 4530. Hardware 4525 may include communication interface 4526 for setting up and maintaining a wired or wireless connection with an interface of a different communication device of communication system 4500, as well as radio interface 4527 for setting up and maintaining at least wireless connection 4570 with UE 4530 located in a coverage area (not shown in FIG. 13) served by base station 4520. Communication interface 4526 may be configured to facilitate connection 4560 to host computer 4510. Connection 4560 may be direct or it may pass through a core network (not shown in FIG. 14) of the telecommunication system and/or through one or more intermediate networks outside the telecommunication system. In the embodiment shown, hardware 4525 of base station 4520 further includes processing circuitry 4528, which may comprise one or more programmable processors, application-specific integrated circuits, field programmable gate arrays or combinations of these (not shown) adapted to execute instructions. Base station 4520 further has software 4521 stored internally or accessible via an external connection.

Communication system 4500 further includes UE 4530 already referred to. Its hardware 4535 may include radio interface 4537 configured to set up and maintain wireless connection 4570 with a base station serving a coverage area in which UE 4530 is currently located. Hardware 4535 of UE 4530 further includes processing circuitry 4538, which may comprise one or more programmable processors, application-specific integrated circuits, field programmable gate arrays or combinations of these (not shown) adapted to execute instructions. UE 4530 further comprises software 4531, which is stored in or accessible by UE 4530 and executable by processing circuitry 4538. Software 4531 includes client application 4532. Client application 4532 may be operable to provide a service to a human or non-human user via UE 4530, with the support of host computer 4510. In host computer 4510, an executing host application 4512 may communicate with the executing client application 4532 via OTT connection 4550 terminating at UE 4530 and host computer 4510. In providing the service to the user, client application 4532 may receive request data from host application 4512 and provide user data in response to the request data. OTT connection 4550 may transfer both the request data and the user data. Client application 4532 may interact with the user to generate the user data that it provides.

Figure 16:
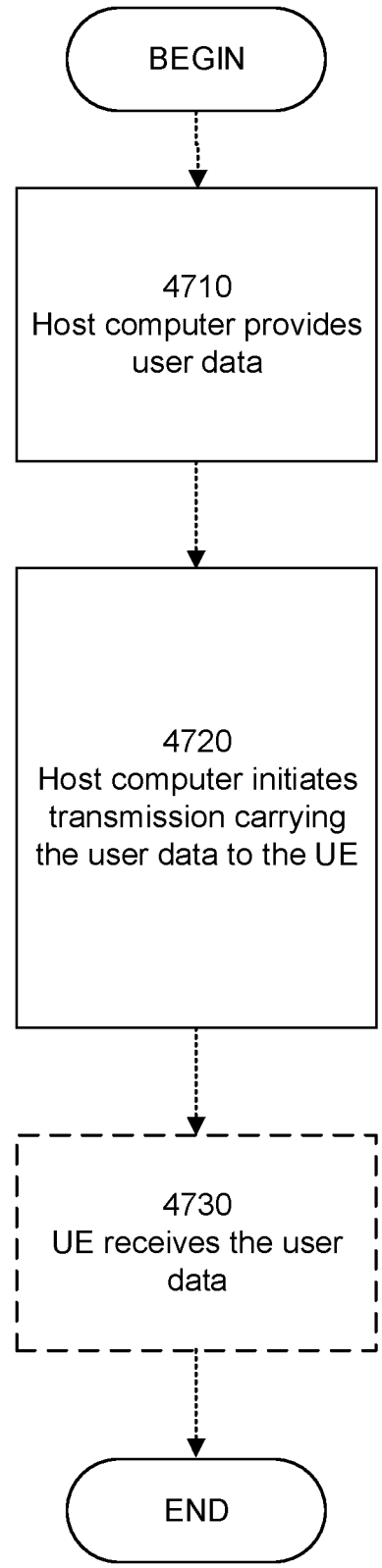
FIG. 16 is a block diagram of methods implemented in a communication system including a host computer, a base station, and a UE.

It is noted that host computer 4510, base station 4520 and UE 4530 illustrated in FIG. 17 may be similar or identical to host computer 4430, one of base stations 4412a, 4412b, 4412c and one of UEs 4491, 4492 of FIG. 16, respectively. This is to say, the inner workings of these entities may be as shown in FIG. 14 and independently, the surrounding network topology may be that of FIG. 13.

In FIG. 14, OTT connection 4550 has been drawn abstractly to illustrate the communication between host computer 4510 and UE 4530 via base station 4520, without explicit reference to any intermediary devices and the precise routing of messages via these devices. Network infrastructure may determine the routing, which it may be configured to hide from UE 4530 or from the service provider operating host computer 4510, or both. While OTT connection 4550 is active, the network infrastructure may further take decisions by which it dynamically changes the routing (e.g., on the basis of load balancing consideration or reconfiguration of the network).

Wireless connection 4570 between UE 4530 and base station 4520 is in accordance with the teachings of the embodiments described throughout this disclosure. One or more of the various embodiments may improve the performance of OTT services provided to UE 4530 using OTT connection 4550, in which wireless connection 4570 forms the last segment. More precisely, the teachings of these embodiments may improve the random access speed and/or reduce random access failure rates and thereby provide benefits such as faster and/or more reliable random access.

A measurement procedure may be provided for the purpose of monitoring data rate, latency and other factors on which the one or more embodiments improve. There may further be an optional network functionality for reconfiguring OTT connection 4550 between host computer 4510 and UE 4530, in response to variations in the measurement results. The measurement procedure and/or the network functionality for reconfiguring OTT connection 4550 may be implemented in software 4511 and hardware 4515 of host computer 4510 or in software 4531 and hardware 4535 of UE 4530, or both. In embodiments, sensors (not shown) may be deployed in or in association with communication devices through which OTT connection 4550 passes; the sensors may participate in the measurement procedure by supplying values of the monitored quantities exemplified above, or supplying values of other physical quantities from which software 4511, 4531 may compute or estimate the monitored quantities. The reconfiguring of OTT connection 4550 may include message format, retransmission settings, preferred routing etc.; the reconfiguring need not affect base station 4520, and it may be unknown or imperceptible to base station 4520. Such procedures and functionalities may be known and practiced in the art. In certain embodiments, measurements may involve proprietary UE signaling facilitating host computer 4510's measurements of throughput, propagation times, latency and the like. The measurements may be implemented in that software 4511 and 4531 causes messages to be transmitted, in particular empty or 'dummy' messages, using OTT connection 4550 while it monitors propagation times, errors or the like.

Figure 15:
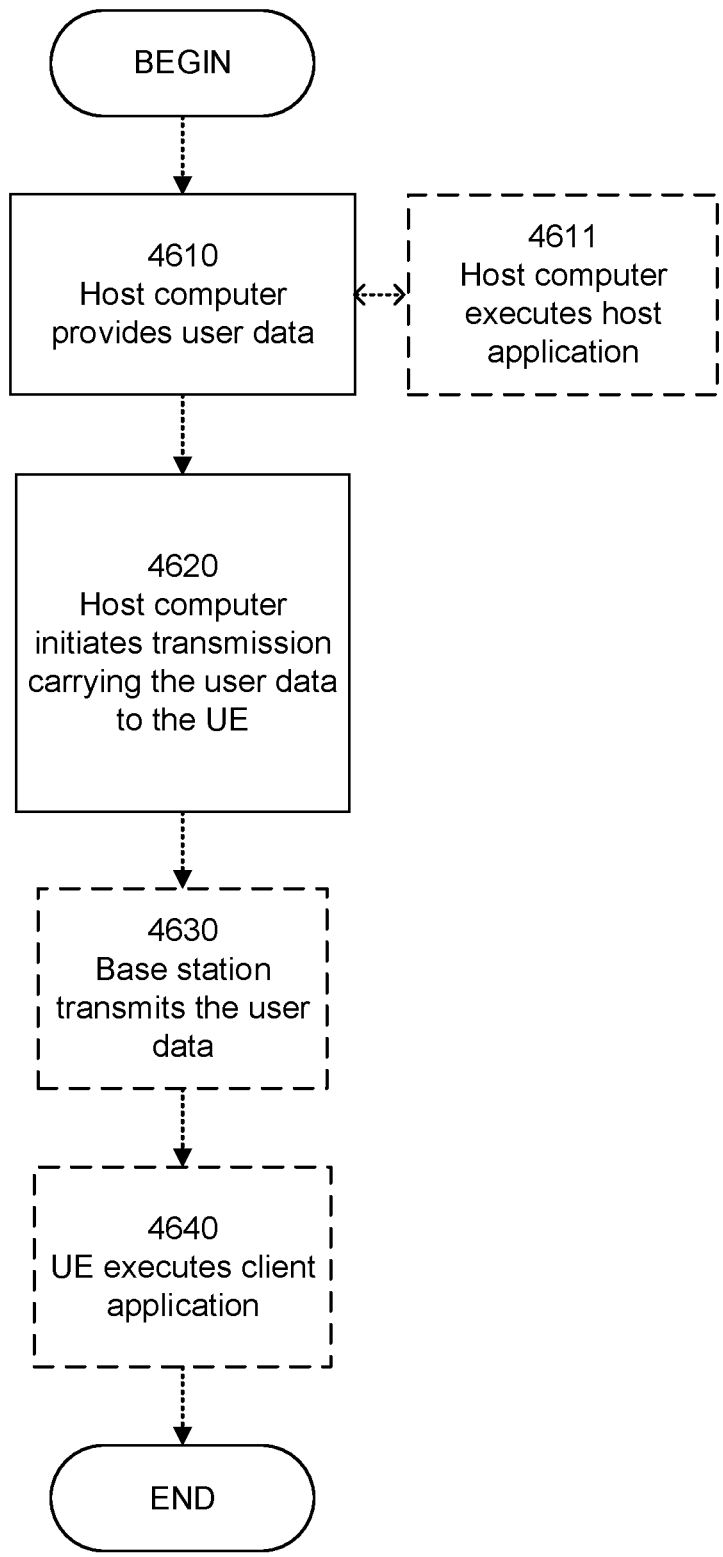
FIG. 15 is a block diagram of methods implemented in a communication system including a host computer, a base station, and a UE.

FIG. 15 is a block diagram of methods implemented in a communication system including a host computer, a base station, and a user equipment according to some embodiments. The communication system includes a host computer, a base station and a UE which may be those described with reference to FIGS. 10-11. For simplicity of the present disclosure, only drawing references to FIG. 15 will be included in this section. In step 4610, the host computer provides user data. In substep 4611 (which may be optional) of step 4610, the host computer provides the user data by executing a host application. In step 4620, the host computer initiates a transmission carrying the user data to the UE. In step 4630 (which may be optional), the base station transmits to the UE the user data which was carried in the transmission that the host computer initiated, in accordance with the teachings of the embodiments described throughout this disclosure. In step 4640 (which may also be optional), the UE executes a client application associated with the host application executed by the host computer.

FIG. 16 is a block diagram of methods implemented in a communication system including a host computer, a base station, and a user equipment according to some embodiments. The communication system includes a host computer, a base station and a UE which may be those described with reference to FIGS. 10-11. For simplicity of the present disclosure, only drawing references to FIG. 16 will be included in this section. In step 4710 of the method, the host computer provides user data. In an optional substep (not shown) the host computer provides the user data by executing a host application. In step 4720, the host computer initiates a transmission carrying the user data to the UE. The transmission may pass via the base station, in accordance with the teachings of the embodiments described throughout this disclosure. In step 4730 (which may be optional), the UE receives the user data carried in the transmission FIG. 17 is a block diagram of methods implemented in a communication system including a host computer, a base station, and a user equipment according to some embodiments. The communication system includes a host computer, a base station and a UE which may be those described with reference to FIGS. 10-11. For simplicity of the present disclosure, only drawing references to FIG. 16 will be included in this section. In step 4810 (which may be optional), the UE receives input data provided by the host computer. Additionally or alternatively, in step 4820, the UE provides user data. In substep 4821 (which may be optional) of step 4820, the UE provides the user data by executing a client application. In substep 4811 (which may be optional) of step 4810, the UE executes a client application which provides the user data in reaction to the received input data provided by the host computer. In providing the user data, the executed client application may further consider user input received from the user. Regardless of the specific manner in which the user data was provided, the UE initiates, in substep 4830 (which may be optional), transmission of the user data to the host computer. In step 4840 of the method, the host computer receives the user data transmitted from the UE, in accordance with the teachings of the embodiments described throughout this disclosure.

FIG. 18 is a block diagram of methods implemented in a communication system including a host computer, a base station, and a user equipment according to some embodiments. FIG. 18 is a flowchart illustrating a method implemented in a communication system, in accordance with one embodiment. The communication system includes a host computer, a base station and a UE which may be those described with reference to FIGS. 10-11. For simplicity of the present disclosure, only drawing references to FIG. 18 will be included in this section. In step 4910 (which may be optional), in accordance with the teachings of the embodiments described throughout this disclosure, the base station receives user data from the UE. In step 4920 (which may be optional), the base station initiates transmission of the received user data to the host computer. In step 4930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors, DSPs, special-purpose digital logic, and the like. The processing circuitry may be configured to execute program code stored in memory, which may include one or several types of memory such as read-only memory (ROM), random-access memory, RAM, cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 19:
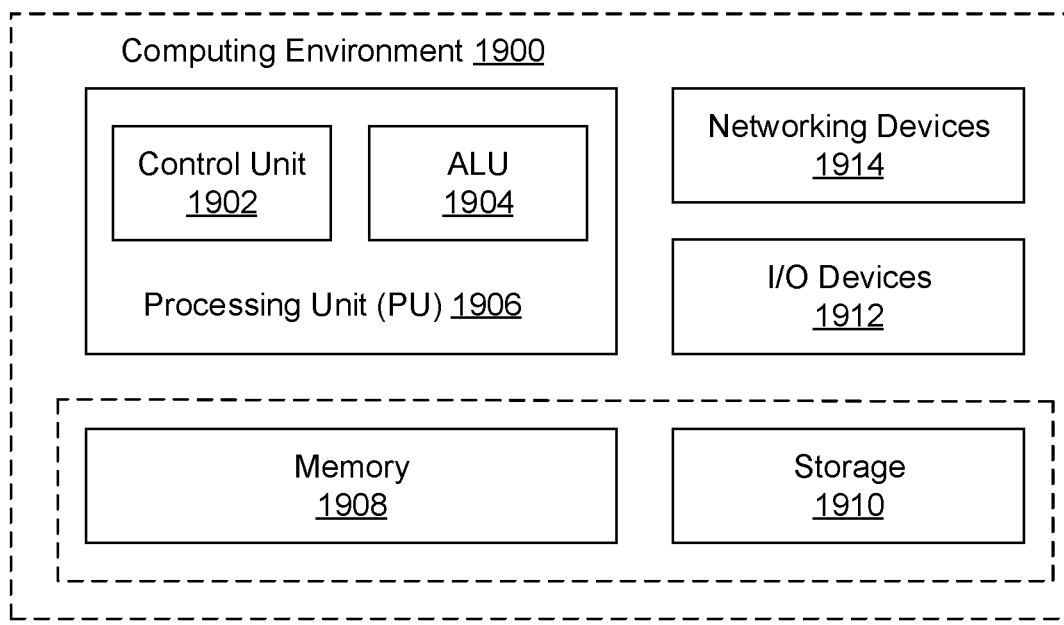
FIG. 19 discloses an example computing environment.

FIG. 19 discloses an example computing environment 1900 implementing a method and the network node and the UE for transmission of MBS services to the UE as described in the FIGS. 2, 3 and 4. As depicted in FIG. 19, the computing environment 1900 comprises at least one data processing unit 1906 that is equipped with a control unit 1902 and an Arithmetic Logic Unit, A L U 1904, a memory 1908, a storage 1910, plurality of networking devices 1914 and a plurality Input output, I/O devices 1912. The data processing unit 1906 is responsible for processing the instructions of the algorithm. For example, the data processing unit 1906 is equivalent to the processor of the network node. The data processing unit 1906 is capable of executing software instructions stored in memory 1908. The data processing unit 1906 receives commands from the control unit 1902 in order to perform its processing. Further, any logical and arithmetic operations involved in the execution of the instructions are computed with the help of the ALU 1904.

The computer program is loadable into the data processing unit 1906, which may, for example, be comprised in an electronic apparatus (such as a UE or a network node). When loaded into the data processing unit 1906, the computer program may be stored in the memory 1908 associated with or comprised in the data processor. According to some embodiments, the computer program may, when loaded into and run by the data processing unit 1906, cause execution of method steps according to, for example, any of the methods illustrated in FIGS. 2, 3 and 4 or otherwise described herein The overall computing environment 1900 may be composed of multiple homogeneous and/or heterogeneous cores, multiple CPUs of different kinds, special media and other accelerators. The data processing unit 1906 is responsible for processing the instructions of the algorithm. Further, the plurality of data processing units 1906 may be located on a single chip or over multiple chips.

The algorithm comprising of instructions and codes required for the implementation are stored in either the memory 1908 or the storage 1910 or both. At the time of execution, the instructions may be fetched from the corresponding memory 1908 and/or storage 1910, and executed by the data processing unit 1906.

In case of any hardware implementations various networking devices 1914 or external I/O devices 1912 may be connected to the computing environment to support the implementation through the networking devices 1914 and the I/O devices 1912.

The embodiments disclosed herein can be implemented through at least one software program running on at least one hardware device and performing network management functions to control the elements. The elements shown in FIG. 19 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the disclosure.

The invention claimed is:

1. A method performed by a target network node for transmission of Multicast and Broadcast services, MBS, to a user equipment, UE in a wireless communication network, wherein the method comprises:
  determining that the UE is involved in a MBS session with a source network node; and
  upon the determination that the UE involved in the MBS session with the source network node,
  i. obtaining a MBS context of the UE related to the MBS session, and
  ii. determining provisioning of a Point-To-Multipoint, PTM, configuration information associated with the MBS session to be acquired by the UE for enabling continuous reception of MBS data from the target network node; and
  transmitting PTM configuration information associated with the MBS session to:
    the UE in a message B, MSG B or a message 4, MSG 4;
    to the UE in a message 6, MSG 6; or
    to the source network node in a HANDOVER request ACKNOWLEDGE message comprising a MBS configuration information when a HANDOVER request message is received from the source network node.

2. The method according to claim 1, further comprising:
  deciding a RRC state of the UE for reception of MBS data based on one or more of: one or more network parameters for the MBS, capability information of the UE and one or more MBS parameters.

3. The method according to claim 1, wherein the step of determining that the UE is involved in a MBS session with the source network node comprises:
  receiving, from the UE, a message indicating that the UE is involved in a MBS session with the source network node.

4. The method according to claim 3, wherein the message is one of: a message A, MSG A, a message 3, MSG 3 and a message 5, MSG 5 of a random access procedure.

5. The method according to claim 4, wherein the MSG 3 comprises one or more of: a RRC setup request with a cause, RRC resume request with a cause, RRC system information request, and one or more temporary mobile group identifiers, TMGIs.

6. The method according to claim 4, wherein the MSG 5 comprises one or more of: a RRC setup complete message comprising TMGIs and a RRC resume complete message comprising TMGIs.

7. The method according to claim 3, further comprising:
  receiving from a source network node a HANDOVER request message comprising the MBS context of the UE related to the MBS session when the UE is in a RRC CONNECTED state.

8. The method according to claim 1, wherein the MBS context of the UE related to the MBS session further comprises one or more of: a UE identifier; a session identifier; a source network node identifier; and a temporary mobile group identity, TMGI.

9. The method according to claim 1, wherein the step of obtaining the MBS context of the UE related to the MBS session when the UE is involved in the MBS session with the source network node comprises obtaining the MBS context from one or more of:
  the source network node; and
  an access and mobility management function, AMF in a core network, CN.

10. The method according to claim 9, wherein the step of obtaining the MBS context from the source network node comprises:
  determining that the UE is in a RRC INACTIVE state;
  receiving a resume identity related to the MBS session from the UE;
  transmitting the resume identity to the source network node to identify the MBS context of the UE at the source network node; and
  obtaining the MBS context of the UE from the source network node.

11. The method according to claim 9, wherein the step of obtaining the MBS context of the UE related to the MBS session from the AMF in the CN comprises:
  determining that the UE is in an RRC IDLE state;
  receiving information related to the MBS session, said information comprising one or more of: a serving temporary mobile subscriber identity, S-TMSI, a temporary mobile group identity, TMGI, and a session identifier, ID, from the UE;
  performing a RRC connection establishment with the AMF by transmitting an INITIAL UE MESSAGE to the AMF; and
  transmitting the TMGI associated with the UE to the AMF;
  determining that MBS context of the UE is available at the AMF; and
  obtaining the MBS context of the UE in a Next Generation Application Protocol, NGAP, message when the MBS context is available at the AMF.

12. The method according to claim 11, further comprising:
  determining that the MBS context of the UE is unavailable at the AMF; and
  receiving an indication from the AMF to initiate a new MBS session for the UE when the MBS context of the UE is unavailable at the AMF.

13. The method according to claim 1, wherein the PTM configuration information comprises PTM configuration for the MBS session, said PTM configuration for the MBS session comprising one or more of:
  a service identifier;
  a session identifier;
  a group radio network temporary identifier, G-RNTI;
  information related to scheduling of PTM data;
  information indicating at least one neighboring node transmitting the MBS session;
  PTM configuration for a cell served by the target network node; and PTM configuration for one or more MBS sessions in the target network node.

14. The method according to claim 1, wherein the MSG B or the MSG4 comprises one or more of:
   a system information block, SIB, indicating the PTM configuration information;
   a new information element, IE indicating the PTM configuration information;
   an indication whether or not to change RRC state for continuing the reception of MBS data from the target network node;
   an indication for resuming a suspended PTP radio bearer when the UE is in RRC INACTIVE state; and
   an indication for configuring a new PTP radio bearer when the UE is in RRC CONNECTED state.

15. The method according to claim 1, wherein the MSG6 comprises one or more of:
   an indication whether or not to change a RRC state for continuing the reception of MBS data from the target network node; and
   an indication whether to use a PTP radio bearer or a PTM radio bearer for reception of MBS data.

16. The method according to claim 1, further comprising:
   determining that the MBS session of the UE is provided to one or more additional UEs in an area served by the target network node, wherein the MBS session is provided to the one or more additional UEs using a Point-To-Point, PTP bearer;
   deciding to switch the PTP bearer to a PTM bearer to the one or more additional UEs; and
   determining to provision the PTM configuration to the one or more additional UEs for transmission of the MBS data to the UE.

17. The method according to claim 16, further comprising:
   determining that the MBS session of the UE is not provided to the one or more additional UEs in the area served by the target network node;
   initiating a new MBS session join procedure with AMF; and
   transmitting to the UE, an indication to use a PTP bearer for provisioning of PTM configuration for reception of the MBS data.

18. A method performed by a source network node for enabling a user equipment, UE, in a wireless communication network to perform continuous reception of Multicast and Broadcast services, MBS, wherein the method comprises:
   determining that the UE is in mobility and involved in a MBS session with the source network node;
   transmitting a MBS context related to the MBS session to one or more neighboring network nodes while the UE is in mobility, wherein one of the one or more neighboring network nodes is a target network node, wherein the MBS context comprises one or more of a UE identifier and a source network node identifier; and
   receiving, from the target network node, PTM configuration information associated with the MBS session in a HANDOVER request ACKNOWLEDGE message comprising a MBS configuration information when a HANDOVER request message is transmitted from the source network node.

19. The method according to claim 18, wherein the step of transmitting a MBS context related to the MBS session to one or more neighboring network nodes while the UE is in mobility comprises:
   determining that the UE is in a RRC CONNECTED state during mobility;
   receiving a HANDOVER request message from the UE; and
   transmitting the HANDOVER request message comprising the MBS context of the UE related to the MBS session to one or more neighboring network nodes.

20. The method according to claim 18, further comprising:
   receiving a PTM configuration from one or more neighboring network nodes in a HANDOVER request ACKNOWLEDGE message comprising configuration information of the MBS session; and
   transmitting a RRC reconfiguration message comprising the configuration information of the MBS session to the UE.

21. The method according to claim 18, wherein the PTM configuration information comprises PTM configuration for the MBS session, said PTM configuration for the MBS session comprising one or more of:
   a service identifier;
   a session identifier;
   a group radio network temporary identifier, G-RNTI;
   information related to scheduling of PTM data; and
   information indicating at least one neighboring node transmitting the MBS session.

22. The method according to claim 18, wherein the MBS context is identified using a context identifier assigned by the source network node.

23. A method performed by a user equipment, UE for reception of Multicast and Broadcast services, MBS, from a target network node in a wireless communication network, wherein the method comprises:
   determining that a MBS session is ongoing at the UE with a source network node;
   transmitting a message indicating that the UE is involved in the MBS session with the source network node; and
   receiving Point-To-Multipoint, PTM, configuration information associated with the MBS session to be acquired for continuous reception of MBS data from the target network node based on the transmitted message, wherein the PTM configuration information is received from the target network node in a message B, MSG B, a message 4, MSG 4, or a message 6, MSG 6.

24. The method according to claim 23, wherein transmitting the message indicating that the UE is involved in the MBS session with the source network node is while the UE is in one of an IDLE state and an INACTIVE state.

25. The method according to claim 23, wherein the message is one of: a message A, MSG A, a message 3, MSG 3, and a message 5, MSG 5, of a random access procedure.

* * * * *